(12) United States Patent
Opsasnick et al.

(10) Patent No.: US 6,434,145 B1
(45) Date of Patent: Aug. 13, 2002

(54) PROCESSING OF NETWORK DATA BY PARALLEL PROCESSING CHANNELS

(75) Inventors: Eugene N. Opsasnick, Saratoga; Alexander Joffe, Palo Alto, both of CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 09/102,972

(22) Filed: Jun. 22, 1998

(51) Int. Cl.[7] .............................................. H04L 12/56
(52) U.S. Cl. ........................ 370/394; 370/366; 370/535
(58) Field of Search .................... 370/356, 394, 370/366, 368, 535, 536, 537, 370, 388, 389, 542, 545; 375/260, 349; 709/107, 250

(56) References Cited

U.S. PATENT DOCUMENTS

| | | | | |
|---|---|---|---|---|
| 5,351,239 A | * | 9/1994 | Black et al. | 370/476 |
| 5,398,241 A | * | 3/1995 | Witchey | 370/391 |
| 5,732,041 A | | 3/1998 | Joffe | 365/230.05 |
| 5,875,192 A | * | 2/1999 | Cam et al. | 370/474 |
| 5,903,573 A | * | 5/1999 | Wolf | 370/535 |
| 6,134,246 A | * | 10/2000 | Cai et al. | 370/474 |
| 6,208,650 B1 | * | 3/2001 | Hassell et al. | 370/392 |
| 6,307,860 B1 | * | 10/2001 | Joffe et al. | 370/412 |

* cited by examiner

*Primary Examiner*—Ricky Ngo
*Assistant Examiner*—Tri Phan
(74) *Attorney, Agent, or Firm*—Skjerven Morrill LLP; Omkar K. Suryadevara; Michael Shenker

(57) ABSTRACT

Different frames received on a first port are processed by different processing channels in parallel. The processed frames are transmitted to a second port in the same order in which they were received on the first port. The ordering is maintained using a FIFO that receives the number of a processing channel whenever a frame is dispatched to the processing channel. The processing channels are selected to provide frames to the second port in the order of the channel numbers in the ordering FIFO.

37 Claims, 17 Drawing Sheets

| Ord. FIFO Entry No. | Ordering FIFO | Frames Dispatched |
| --- | --- | --- |
| 0 | 0 | F00 |
| 1 | 1 | F01 |
| 2 | M2 | MF02 |
| 3 | 3 | F03 |
| 4 | 0 | F10 |
| 5 | 1 | F11 |
| 6 | 2 | F12 |
| 7 | 3 | F13 |
| 8 | 0 | F20 |
| 9 | 1 | F21 |
| 10 | 2 | F22 |
| 11 | 3 | F23 |
| 12 | 0 | F30 |
| 13 | 1 | F31 |
| 14 | 2 | F32 |
| 15 | 3 | F33 |
| 16 | 0 | F40 |
| 17 | 1 | F41 |
| 18 | M2 | MF42 |
| 19 | 3 | F43 |

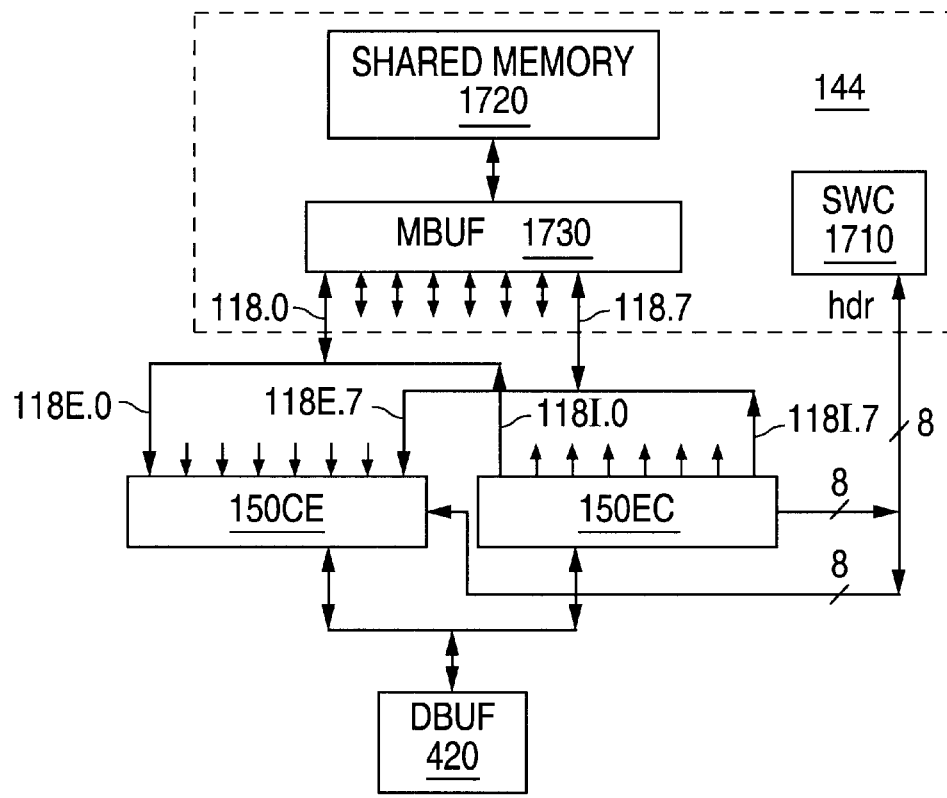
FIG. 17
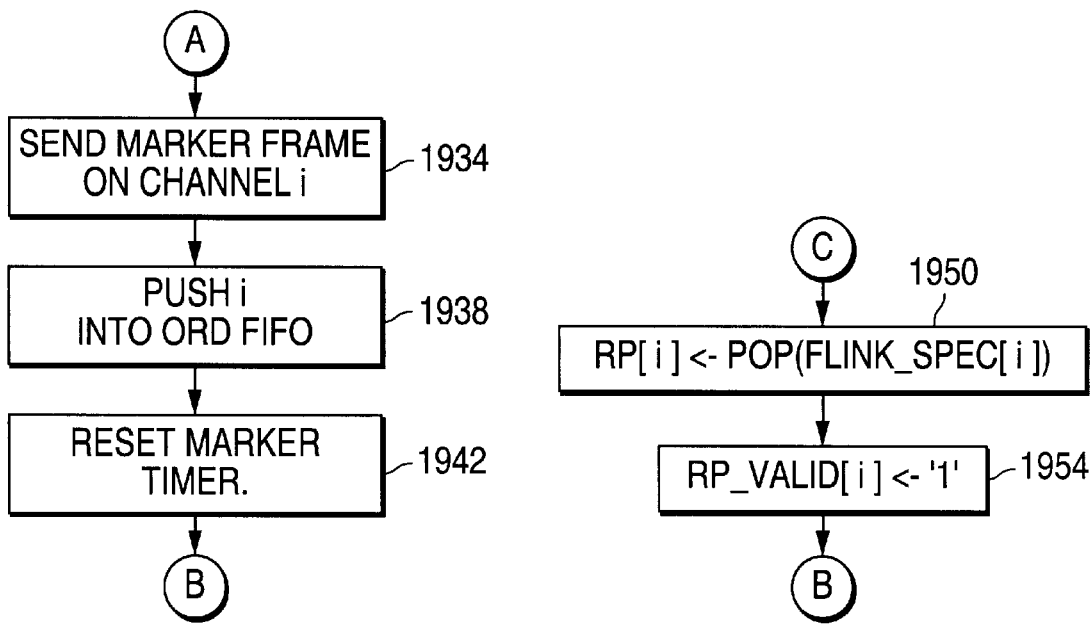
FIG. 19B  FIG. 19C

PROCESSING OF NETWORK DATA BY PARALLEL PROCESSING CHANNELS

CROSS REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to network data processing.

When data are transferred in networks, the data may have to be processed at intermediate or end transfer points. The data processing may involve address resolution, protocol transformations between different protocols, implementing connectivity restrictions imposed for security reasons or to reduce network congestion, and possibly other processing. Sometimes the data processing throughput does not keep up with data transmission rates. Therefore, systems are needed which can take advantage of high data transmission rates while still using data processing equipment having lower throughput.

SUMMARY

In some embodiments, the present invention allows one to take advantage of high data transmission rates while still using data processing equipment with lower throughput. In some embodiments, this is achieved by using multiple data processing channels in parallel to increase the total data processing throughput. In some embodiments, the data ordering is maintained as if the data were processed sequentially by a single processing channel.

More particularly, in some embodiments, a first flow of data is received on a first network port by a first circuit. The first circuit dispatches received data to different processing channels so that different channels process different pieces of data in parallel. A second circuit receives the data from the processing channels and dispatches the data to a second flow on a second network port. At least one of the first and second flows has a greater throughput than at least one of the processing channels. However, the processing throughput is high because different channels process the data in parallel.

In some embodiments, in at least one of the first and second flows data are transferred in frames. Each frame is processed by a single processing channel. The frames may emerge from the processing channels not necessarily in the order in which the frames were received on the first port. However, the second circuit reorders the frames received from the processing channels so that the data are transmitted on the second port in the same order in which they were received on the first port. This may be important for some applications in which a source station transmitting the data to the first port and a destination station receiving the data from the second port may want the frame ordering to be unchanged during transmission. In particular, the system of the present invention is suitable for connection oriented protocols which require the frame ordering to be preserved.

In some embodiments that preserve data ordering, it is desirable to minimize changes needed to be made to the processing channels when the processing channels are used in the system of the present invention. More particularly, in the system of the present invention, each processing channel processes a portion of a data flow between the first and second ports. However, each processing channel may have been designed to process an entire data flow. Therefore, the processing channels may have no mechanism to assist the first and second circuits to maintain frame ordering. Hence, in some embodiments, when the first circuit dispatches a frame to the processing channel, the first circuit does not modify the frame with any information that could be recognized by the second circuit or the processing channel and used to maintain the frame order. When the second circuit receives frames from the processing channels, the processing channels do not provide any information as to the order of the frame in the first data flow. Therefore, in some embodiments, the frame ordering information is provided by the first circuit directly to the second circuit.

Thus, some embodiments include an ordering FIFO between the first and second circuits. When the first circuit dispatches a frame to a processing channel, the first circuit pushes (i.e. queues) the processing channel ID (for example, the processing channel number) into the ordering FIFO. The second circuit pops, (dequeues) the channel IDs from the ordering FIFO, and dispatches the frames to the second flow from the channels in the order of the channel IDs. For example, if the first circuit pushed the channel IDs 1, 2, 4, 1, in that order, into the ordering FIFO, the second circuit will dispatch a frame received from channel 1, then a frame received from channel 2, then a frame received from channel 4, then a frame received from channel 1. Therefore, the frames will be dispatched to the second flow in the same order in which they were dispatched by the first circuit to the processing channels, which is the order of the frames in the first data flow.

In some embodiments, a processing channel may drop a frame due, for example, to a buffer-full condition in the channel. Then the frame ordering can be violated. To restore the frame ordering, the first circuit dispatches a "marker" frame on each channel once in a while. When the corresponding channel ID is pushed into the ordering FIFO, a "marker" bit is set in the ordering FIFO entry to indicate that the channel ID corresponds to a marker frame.

The marker frame itself is distinguished in some way that will allow the second circuit to recognize such frames. For example, in some embodiments, the marker frames are distinguished by a source address being a broadcast address or some other illegal address.

Each time the second circuit pops a channel ID from the ordering FIFO, the second circuit also pops the corresponding marker bit. If the marker bit indicates a marker frame but the corresponding frame from the channel is not a marker frame, the marker frame was possibly dropped by the channel. Perhaps, other frames have also been dropped. Therefore, the frame received from the channel is not transmitted at least until another channel ID is popped corresponding to the same channel. Further, the second circuit requests the first circuit to send another marker frame on the same channel.

If the marker bit from the ordering FIFO indicates a non-marker frame but the frame received from the corresponding channel is a marker frame, one or more non-marker frames have possibly been dropped by the channel. Therefore, no frames are transmitted from the channel until another channel ID identifying the same channel and accompanied by a marker bit set is popped from the ordering FIFO. In this way, the frame ordering is restored.

In some embodiments, the channels also process traffic flowing from the second port to the first port. A separate ordering FIFO is provided for this traffic.

Some embodiments include multiple first ports and/or multiple second ports. The second circuit reorders the frames as needed so that the frames are transmitted on one or more second ports in the same order in which they arrived on one or more first ports. In some embodiments, only frames received on the same first port are transmitted in the order in which they arrived, and/or only frames transmitted on the same second port are transmitted in the order in which they arrived on one or more first ports. In some embodiments, a separate ordering FIFO is provided for each first port for the traffic from the first ports to the second ports, and a separate ordering FIFO is provided for each second port for the traffic from the second ports to the first ports. Each processing channel processes traffic from only one first port and/or only one second port, and the ordering in the data flow between each pair of the first and second ports is maintained, i.e., data are transmitted on one of the first and second ports in the same order in which the data were received on the other one of the first and second ports.

In some embodiments, multiple flows are transferred through a single port, so that the port is treated as a plurality of logical sub-ports with each sub-port handling a single data flow.

Other features and advantages of the invention are described below. The invention is defined by the appended claims.

BRIEF DESCRIPTION OF THE DRAWINGS

FIG. 17 is a block diagram illustrating some features of one embodiment of the system of FIG. 4.

FIGS. 18, 19A, 19B, 19C are flowcharts illustrating the operation of the system of FIG. 4.

DESCRIPTION OF PREFERRED EMBODIMENTS

Figure 1:
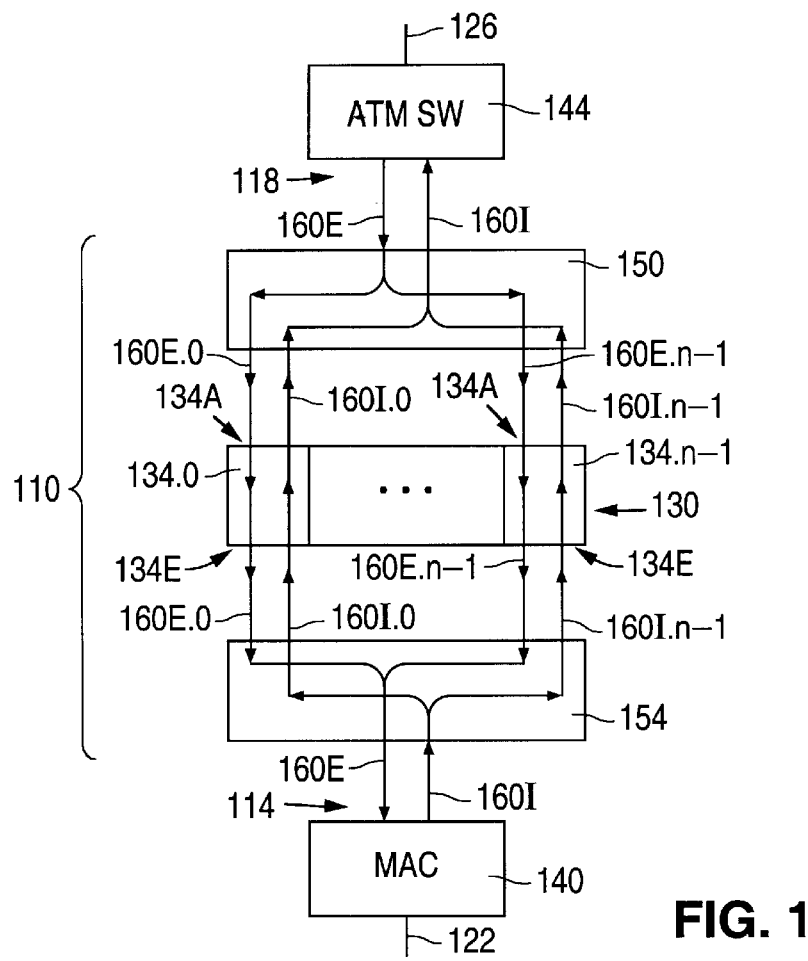
FIG. 1 is a block diagram of a system that processes data transferred between two ports according to the present invention.

FIG. 1 illustrates a system 110 that transfers data between ports 114 and 118 of two respective networks 122, 126. System 110 includes a port interface processor 130 having some number "n" of processing channels 134.0, . . . , 134.n-1. The processing channels process the data in parallel. Each channel has a lower throughput than the data flow on port 114 or 118.

In some embodiments, port 114 is a 1 Gbps (gigabits per second) Ethernet port connected to Ethernet segment 122 through MAC 140 and a physical layer device (not shown). Port 118 is 1.2 Gbps ATM port connected to ATM network 126 through ATM switch 144, or connected to a native ATM station. The traffic through port 118 flows at the ATM layer. Each processing channel 134 has a 100 Mbps (megabits per second) port 134E operating according to the standard Ethernet MII protocol and thus suitable for connection to a 100 Mbps Ethernet MAC. The MII interface is operated however at a slightly higher clock rate, 31.25 MHz instead 25 MHz, to provide a 125 Mbps throughput, for a total throughput of 125 Mbps * 8=1 Gbps for eight ports 134E.

Each processing channel 134 also has a 155 Mbps ATM layer port 134A suitable for connection to an ATM switch or a native ATM station. Each processing channel 134 converts data between the ATM and Ethernet formats and, possibly, performs layer 2 and/or layer 3 processing (including address resolution and/or implementing network connectivity restrictions) as appropriate, for example, for MPOA (multi-protocol over ATM) operation.

In some embodiments, the port interface circuit 130 is implemented by one or more software programmable "EPIF" (Ethernet Port Interface Circuit) processors described, for example, in U.S. patent applications Ser. Nos. 09/055,044 "Systems and Methods for Data Transformation and Transfer in Networks" and 09/055,033 "Systems and Methods for Multi-Tasking, Resource Sharing, and Execution of Computer Instructions", both filed by A. Joffe et al. on Apr. 3, 1998 and incorporated herein by reference. The EPIF processor is manufactured by MMC Networks of Sunnyvale, Calif. However, the invention is not limited to the EPIF processor or to the Ethernet or ATM networks.

Each frame of data from networks 122, 126 is processed by a single processing channel 134. Processing of different frames may take a different amount of time. Hence, the frames emerge from processor 130 not necessarily in the order in which they were received on port 114 or 118. However, the frames are reordered by circuit 150 or 154 so that on ports 114 and 118 the frames appear in the same order.

For convenience of reference, we will call the data flow 160I from port 114 to port 118 an "ingress" flow, and the flow 160E from port 118 to port 114 an "egress" flow.

Ingress flow 160I is converted to "n" data flows 160.0, . . . 160I.n-1 by circuit 154. Each flow 160I.x is processed by respective processing channel 134.x. Circuit 154 dispatches each frame from port 114 to one of these parallel data flows 160I.x (x=0, . . . n-1), i.e. to one of processing channels 134.x. In some Ethernet/ATM embodiments, channels 134 convert the Ethernet frames to frames of ATM cells according, for example, to the AAL-5 protocol.

Circuit 150 receives parallel ingress flows 160I.x from channels 134 and recombines them into a single sequential flow 160I at port 118. Circuit 150 orders the frames so that they are transmitted on port 118 in the same order in which they were received on port 114.

The egress processing is similar. Circuit 150 converts the egress flow 160E into n parallel flows 160E.x each of which is processed by respective channel 134.x. In some embodiments, each frame of ATM cells (e.g. an AAL-5 frame) is processed entirely by a single channel 134. Circuit 154 recombines the parallel egress flows 160E.x back into a single egress flow 160E provided on port 114. Circuit 154 orders the frames so that they are transmitted on port 114 in the same order in which they were received on port 118.

Figure 2:
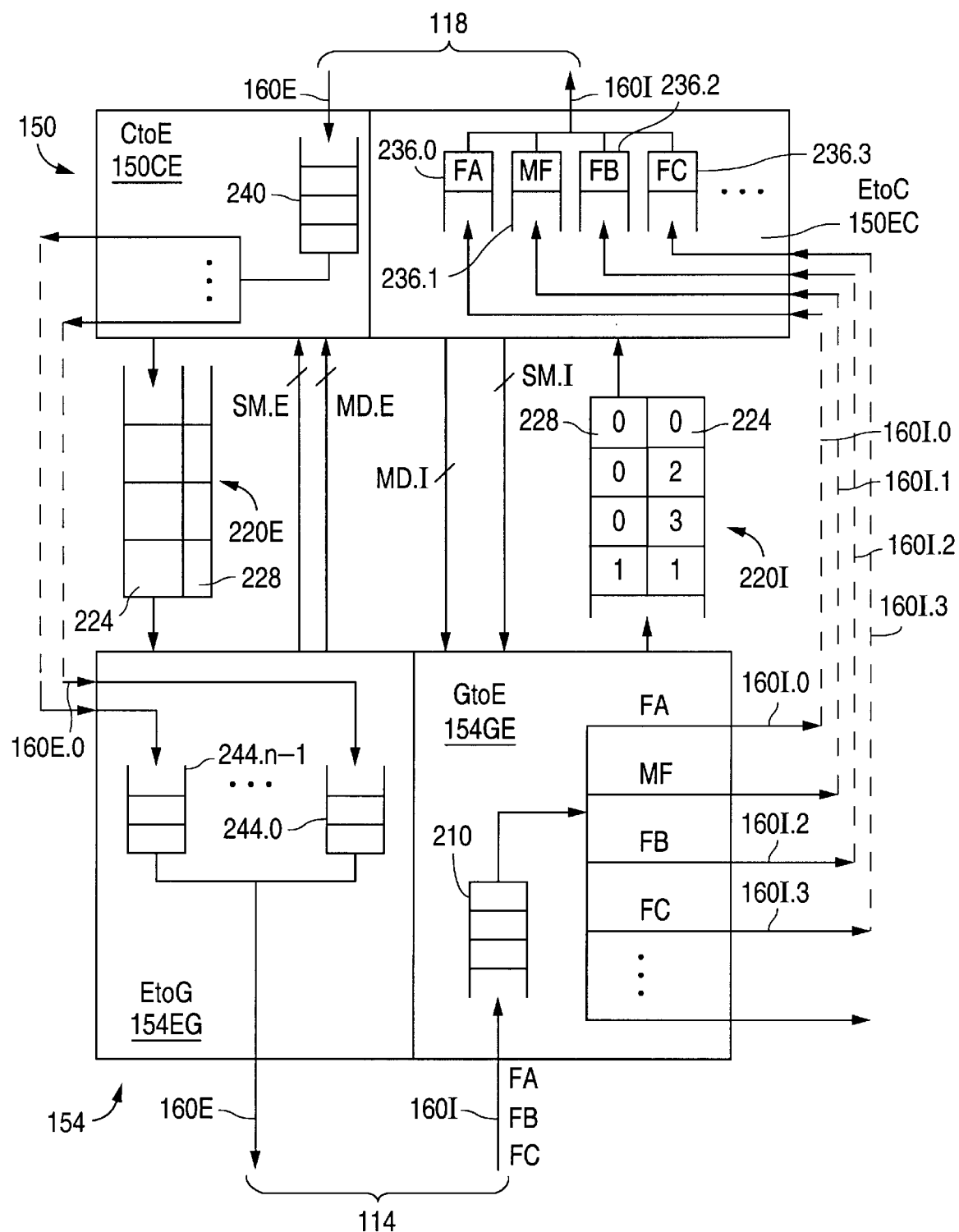
FIG. 2 is a block diagram showing some features of one embodiment of the system of FIG. 1.

FIG. 2 illustrates how the frame ordering is performed in some embodiments. Circuit 154 includes GtoE block 154GE and EtoG block 154EG. "GtoE" stands for "Gigabit to EPIF". (However, the circuit of FIG. 2 is not limited to 1 Gigabit throughput or to the EPIF processor.) "EtoG" stands for EPIF to Gigabit. Block 154GE processes the ingress flow 160I. Block 150EG processes the egress flow 160E.

Similarly, circuit 150 include EtoC block 150EC handling the ingress flow, and CtoE block 150CE handling the egress flow. (EtoC stands for "EPIF to switch Core". CtoE stands for "Core to EPIF".)

Block 154GE queues the incoming frames in queue 210. The frames are dispatched from queue 210 to parallel ingress flows 160I.x. (Flows 160I.x, 160E.x are sometimes called "channels" herein, but they are not to be confused with processing channels 134.x.) When a frame is dispatched to a channel 160I.x, the channel number x (0 through n−1) is pushed into ordering FIFO 220I. Each ordering FIFO entry includes a channel number location 224 and a marker bit 228.

Thus, the channel numbers in ordering FIFO 220I appear in the order in which the channels 160I.x receive frames from queue 210.

In FIG. 2, frames FA, FB, FC were received on port 114 in that order. Frame FA was dispatched to channel 160I.0, frame FB to channel 160I.2, frame FC to channel 160I.3. When that happened, channel numbers 0, 2, 3 were queued ("pushed") into the ordering FIFO 220I in that order.

Block 150EC queues the frames received from each channel 160I.x in the respective queue 236.x. Thus, frames FA, FB, FC are shown queued in the respective queues 236.0, 236.2, 236.3. Block 150EC pops the channel numbers from ordering FIFO 220I, and dispatches the frames from the queues 236 specified by the channel numbers. Each time a channel number x is popped, a frame from the respective queue 236.x is transmitted on port 118 in the order in which the channel number was popped from the ordering FIFO. Thus, in FIG. 2, the next frame transmitted will be from queue 236.0 because the next ordering FIFO entry indicates channel 0. After that, the frames will be transmitted from queues 236.2, 236.3, in that order. Therefore, frames FA, FB, FC will be transmitted in the same order in which they arrived at port 114, even if they were received by block 150EC in a different order.

The egress flow ordering is similar. CtoE block 150CE queues the incoming frames of ATM cells in queue 240 in the order in which the frames arrive. The frames are dispatched to parallel flows ("channels") 160E.x. A whole frame of cells is dispatched to a single channel. When the frame is dispatched, the channel number is queued in "egress" ordering FIFO 220E, together with a marker bit 228.

Block 154EG queues the frames received from each channel 160E.x in the respective queue 244.x. Block 154EG pops the ordering FIFO 220E and transmits the frames from the queues 244 specified by channel numbers in the order in which the channel numbers were popped from the ordering FIFO.

Processor 130 may drop a frame if, for example, a processor buffer gets full or a frame has an error. If a frame has been dropped, frames may be transmitted on port 118 or 114 out of order. Therefore, blocks 154GE and 150CE periodically transmit "marker" frames to restore the frame ordering. FIG. 2 illustrates marker frame MF transmitted on channel 160I.1. In some embodiments, the marker frames are generated by blocks 154GE and 150CE themselves. In other embodiments, the marker frames are frames received on port 114 or 118 but modified ("marked") to be recognized as marker frames. In the embodiment being described, the marker frames are generated by blocks 154GE, 150CE.

When a marker frame is transmitted on a channel, the channel number is pushed into ordering FIFO 220I or 220E just as for non-marker frames (note channel number 1 in the ingress ordering FIFO 220I in FIG. 2). The corresponding marker bit 228 is set to indicate a marker frame. (This bit is 0 for non-marker frames.) Marker frame formats used in some Ethernet/ATM embodiments are described in Addendum 1.

Table 1 below describes actions performed by blocks 150EC, 154EG when these blocks pop the respective ordering FIFO 220I or 220E. The action performed depends on whether the popped queue entry is a marker entry (i.e. has a marker bit set), and whether the corresponding frame in queue 236.x or 244.x is a marker frame. Signals "SM" and "MD" mentioned in the table are described below.

TABLE 1

| Case no. | Is frame a marker frame? | Is FIFO entry a marker entry? | OK? | Meaning | Action |
|---|---|---|---|---|---|
| 1 | No | No | OK | Non-marker frame | Transmit the frame |
| 2 | Yes | Yes | OK | Marker frame | Dequeue and discard the frame. Assert "Marker Done" MD (i.e. MD.I[x] or MD.E[x]) for the channel on which the frame is received, to allow another marker on the channel |
| 3 | Yes | No | Error | Processor dropped a non-marker frame | Do not dequeue marker frame |
| 4 | No | Yes | Error | processor dropped a marker frame and perhaps other frames | Do not dequeue the frame. Assert "Marker Done" (i.e. MD.I[x] or MI.E[x]) and "Send Marker" SM (i.e. SM.I[x] or SM.E[x]) for the channel on which the frame was received |

Figures 3A, 3B:
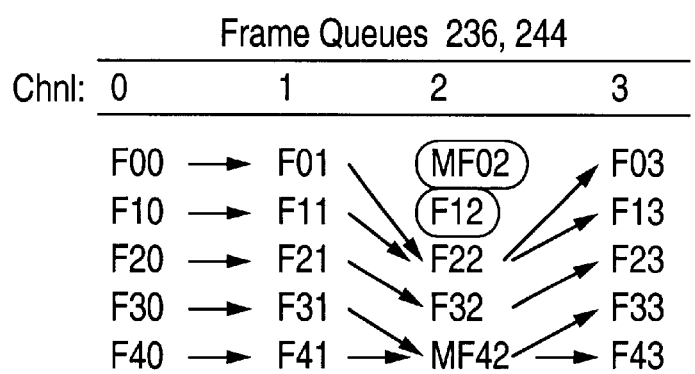
FIGS. 3A and 3B illustrate a frame ordering example for the system of FIG. 2.

An example is illustrated in FIGS. 3A, 3B. In FIG. 3A, the column "Frames Dispatched" shows frames Fij in the order in which they were dispatched by block 154GE or 150CE to processor 130. The prefix M (as in MF02) indicates a marker frame.

The "Ordering FIFO" column shows the ordering FIFO entries created when the frames were dispatched. The prefix M (as in M2) indicates that the marker bit is set. The absence of M indicates that the marker bit is reset.

Thus, the frames F00, F01, F03, F10 . . . arrived in that order, and were dispatched in the same order on corresponding channels 0, 1, 3, 0, . . . Marker frame MF02 was dispatched on channel 2 after frame F01.

In FIG. 3A, the column "Ordering FIFO Entry No." is included to enable convenient reference to the FIFO entries.

FIG. 3B illustrates how the frames were queued in respective queues 236 or 244 when the frames were received from processor 130. Frames F00, F10, F20, F30, F40 were queued in the queue for channel 0 (queue 236.0 or 244.0). Frames F01, F11, . . . were queued in the queue for channel 1; and so on.

In the queue for channel 2, the frames MF02 and F12 are circled, indicating that these frames were dropped by processor 130 and thus did not actually appear in the queue.

In that example, the block 150EC or 154EG will pop the ordering FIFO and will successfully match the FIFO entry no. 0, indicating channel 0, with frame F00, and the FIFO entry no. 1 with frame F01. However, the entry no. 2 ("M2") will be incorrectly matched with non-marker frame F22. The frame F22 will not be dequeued (see case no. 4 in Table 1).

The next ordering FIFO entry no. 3 will be matched with frame F03. This frame will be transmitted (case no. 1 in Table 1).

The next four frames transmitted will be F10, F11, F22, F13, according to the ordering FIFO entries 4–7. Of note, if the frame F12 had not been dropped but only the marker frame MF02 had been dropped, then all the frames would be transmitted in the correct order.

Next, the frames F20, F21, F32, F23, F30, F31 will be transmitted in that order, corresponding to ordering FIFO entries 8–13. Next, the ordering FIFO entry 14 (indicating channel no. 2) will be popped and matched with marker frame MF42. The marker frame will not be dequeued (see case 3 in Table 1). Next, frames F33, F40, F41 will be transmitted (FIFO entries 15–17). After that, the ordering FIFO entry "M2" will be matched with marker frame MF42 (case 2 in Table 1). The marker frame will be dequeued and discarded, and the frames starting with F43 will be transmitted in the correct order.

In some embodiments, only one marker frame is allowed in any given channel at any given time, though different channels may contain marker frames at the same time. Whenever block 150EC dequeues and discards a marker frame received on a channel 160I.x, block 150EC asserts a signal MD.I[x] (Marker Done on ingress channel x) to block 154GE. This signal indicates that another marker frame can be transmitted on channel 160I.x. Similarly, when block 154EG dequeues and discards a marker frame received on a channel 160E.x, block 154EG asserts MD.E[x] to block 150CE, indicating that another marker frame can be transmitted on the channel 160E.x. See Table 1, cases 2 and 4.

On some error conditions indicating possible frame ordering errors, block 150EC asserts a signal SM.I[x] (Send Marker) to request the block 154GE to send a marker on ingress channel 160I.x. See, for example, Table 1, case 4. Similarly, block 154EG asserts SM.E[x] to request a marker on egress channel 160E.x on some error conditions.

In some embodiments the blocks 154GE, 150CE periodically send marker frames on different channels even if the signals SM (that is, SM.I[x] and SM.E[x]) are deasserted. This is done in case there are frame ordering violations not detected by blocks 150EC, 154EG. Thus, in some Ethernet/ATM embodiments having eight channels, block 154GE transmits a marker frame every 128 cycles of ATM switch 144, wherein a switch cycle is 68 cycles of a 25 MHz clock. Consecutive marker frames are transmitted on different ingress channels 160I.x in a round robin fashion. Similarly, block 150CE transmits a marker frame every 128 switch cycles on egress channels 160E.x in a round robin fashion.

Some embodiments allow multiple marker frames in the same channel 160I.x or 160E.x at the same time. In some embodiments, marker field 228 is multiple bits wide to allow for different types of markers. Marker frames corresponding to different types of markers have different formats to allow the blocks 150EC, 154EG to match marker frames of different types with markers of the same types in the ordering FIFO. In some embodiments, only one marker frame of any given type is allowed in a channel at any given time.

The invention is not limited to different types of networks. In some embodiments, networks 122 and 126 are of the same type, for example, ATM.

Further, in some embodiments the system 110 has multiple ports 114 and/or multiple ports 118. At least one of ports 114, 118 has a higher throughput than at least one of processing channels 134. Block 150 reorders the frames as needed so that on each port 118, the frames are transmitted in the same order in which they arrived on a port or ports 114. In some embodiments, only the frames received on the same port 114 are transmitted in the order in which they arrived, and/or only the frames transmitted on the same port 118 are transmitted in the order in which the were received on port or ports 114. Other frames may be transmitted out of order.

When block 154 dispatches a frame to a channel 160I.x, the number x is pushed into an ingress ordering FIFO to indicate to block 150 the order in which the frames should be transmitted. In some embodiments, a separate ordering FIFO is provided for each port 114. The frames arriving at the same port 114 will be transmitted to port or ports 118 in the order in which they arrived, though the frames arriving on different ports 114 can be transmitted not in the order of arrival.

Transfer of frames from port or ports 118 to port or ports 114 is performed similarly, with a single ordering FIFO or a separate ordering FIFO for each port 118.

Now an Ethernet/ATM embodiment for 1 Gbps Ethernet port 114 and a 1.2 Gbps ATM port 118 connected to ATM switch 144 will be described in more detail. The embodiment uses 1 gigabit MAC interface between MAC 140 ("GMAC" in FIG. 4) and system 110. The interface is described in Addendum 2.

Blocks 154EG and 154GE share "data buffer" memory 410 (FIG. 4) which stores the queues 210, 244. In particular, blocks 154EG, 154GE share the address, control and data buses used to access the memory. Similarly, blocks 150EC, 150CE share data buffer memory 420 storing the queues 236, 240. In particular, the two blocks share the address, control and data buses used to access the memory.

In some embodiments, ATM switch 144 is built from a chip set of type ATMS2000 (Trademark) or of type AF5000 (Trademark; alternative name is MSC), both available from MMC Networks of Sunnyvale, Calif. The switch clock frequency is 25 MHz for ATMS2000 or 50 MHz for AF5000. The interface to memory 420 runs at 50 MHz for both ATMS2000 and AF5000. Block 150 runs at 25 MHz. GMAC 140 and block 154 operate at some frequency between 25 and 50 MHz. In some embodiments, that frequency is 31.25 MHz to get a 1 Gbps throughput on the eight MII ports 134E of processor 130, or 33 MHz. The interface to memory 410 operates at the double frequency of 62.5 or 66 MHz.

Processor 130 is built of two of the aforementioned EPIF processors each of which has four processing channels 134, for a total of eight processing channels. Each processing channel 134.x processes sequentially the frames of corresponding flow 160I.x and the frames of corresponding flow 160E.x.

Processor 130 may drop a frame if a frame has errors. To reduce the probability that a frame will be dropped, the blocks 154GE and 150CE check each frame for the receive, CRC, frame length and possibly other errors before sending the frame to the processor. To do this checking, these blocks accumulate a whole frame in the respective queue 210 or 240 before sending any portion of the frame to the processor.

In other embodiments, blocks 154GE, 150CE start transmitting a frame to the processor before the entire frame is accumulated in queue 210 or 240. Markers are used to restore frame ordering if the frames are dropped, as described above.

In some embodiments, some error checks are disabled in the processor. For example, the error checking that the Ethernet frame length is at least 64 and at most 1518 bytes can be disabled. However, a processor might still drop a frame if, for example, a processor buffer becomes full.

In some embodiments, ATM switch 144 can send frames whose destination is a processing channel 134.x. Such frames are called "channel specific" herein. Such frames include programs ("applets") to be executed by the processing channel, or commands to the processing channel. These frames can be used to write processor 130 registers, to update a routing database of the processor, or to read a register or statistical information from the processor. These frames never reach the block 154EG.

In the egress flow, block 150CE recognizes channel specific frames by their VPI[7]=1. (Some embodiments use VPI[15] of some other VPI/VCI bit for this function). Block 150CE has separate frame link FIFOs ("channel specific" FIFOs, described in Addendum 4, part II) which queue pointers to the channel specific frames. These FIFOs are not shown in FIG. 2. The ordering FIFO 220E is not written for channel specific frames.

In the ingress flow, processor 130 can generate frames to switch 144 with statistical or other information. Block 150EC recognizes frames generated by processor 130 by their VPI[7]=1. These frames are queued in queues 236 together with other frames. These frames are not seen by block 154GE, and they do not have corresponding entries in ordering FIFO 220I. If an ordering FIFO entry indicates a channel x and the next frame F in the respective queue 236.x is a frame generated by the processor, the frame F and the frame immediately following F in the queue 236.x are transmitted to port 118 one after another with no intervening frames. In this sense, the frame F is treated as part of the following frame except if the following frame is a marker frame. If the following frame is a marker frame, the frame F is transmitted but the marker frame is not transmitted. The marker frame is matched with the same ordering FIFO entry that was matched with frame F, and is processed per Table 1.

Figure 4:
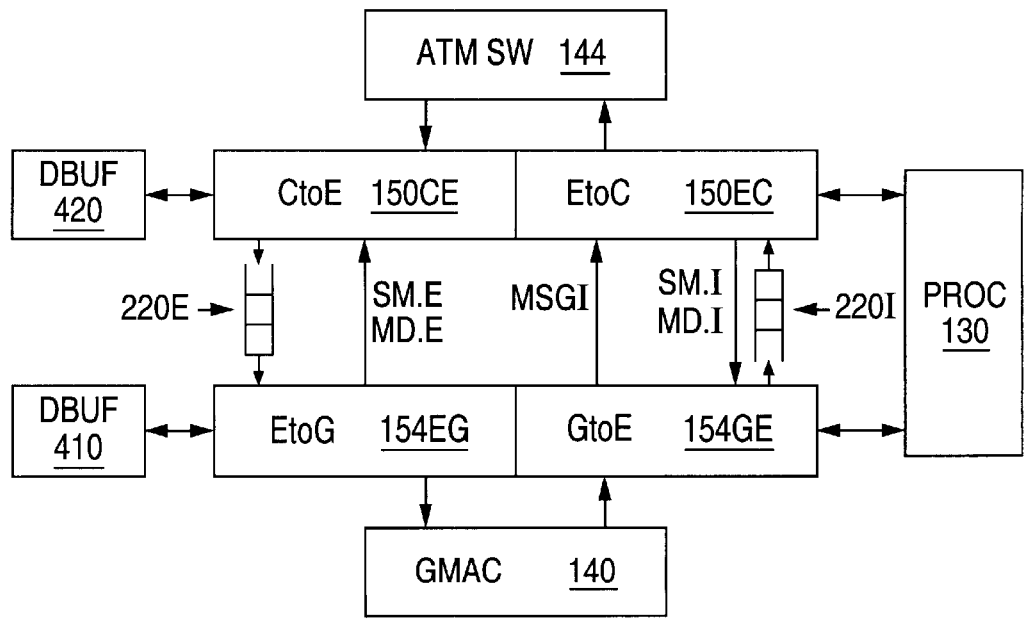
FIG. 4 is a block diagram showing some features of one embodiment of the system of FIG. 2.

In some embodiments of FIG. 4, blocks 154EG, 154GE are implemented in an FPGA (field programmable gate array) of type XC4062XL available from Xilinx Corporation of San Jose, Calif. Blocks 150CE, 150EC are also implemented in an FPGA of type XC4062XL available from Xilinx Corporation. A serial link, MSGI, is used by block 154GE to provide to block 150EC certain error messages and other information, as described in Addendum 5. Block 150EC passes this information to switch 144.

Block 154GE

In block 154GE (FIG. 5), GGI Rx Control block 510 receives data flow 160I from GMAC 140, checks for errors, and drives the data in 64-bit quantities on 69-bit data bus 520 of data buffer 410. In addition to the 64 data bits, each 69-bit word includes: (1) one LIP bit (Last In Packet) indicating whether the 64 data bits include the last data byte of a frame, (2) three "nb" bits indicating the number of valid bytes in the 64 data bits if the LIP bit is set indicating the last byte (nb is "don't care" if LIP is reset), and (3) an M bit indicating whether the frame is a marker frame (the M bit is used by block 154EG but not by block 154GE).

GGI Rx Control 510 (GGI stands for Generic Gigabit Interface) also generates the following signals to Buffer Write Control and Frame Dispatch Block 530 for the data on bus 520:

(1) "data valid",
(2) EOF-ok meaning: (i) end of frame (EOF), that is, LIP is set; and (ii) no errors were detected in the frame; and
(3) EOF-bad (EOF with errors).

Buffer Write Control block 530 writes the ingress ordering FIFO 220I, determines the channel 160I.x to which the next frame is to be dispatched, and provides address and control signals to memory 410 for memory read and write operations. Block 530 generates a "full" signal to block 510 when the ingress ordering FIFO 220I or the queue 210 is full.

MII Rx Control blocks 540 (one block for each ingress channel 160I.x) read the data from data bus 520 and provide the data to processor 130.

Figure 6:
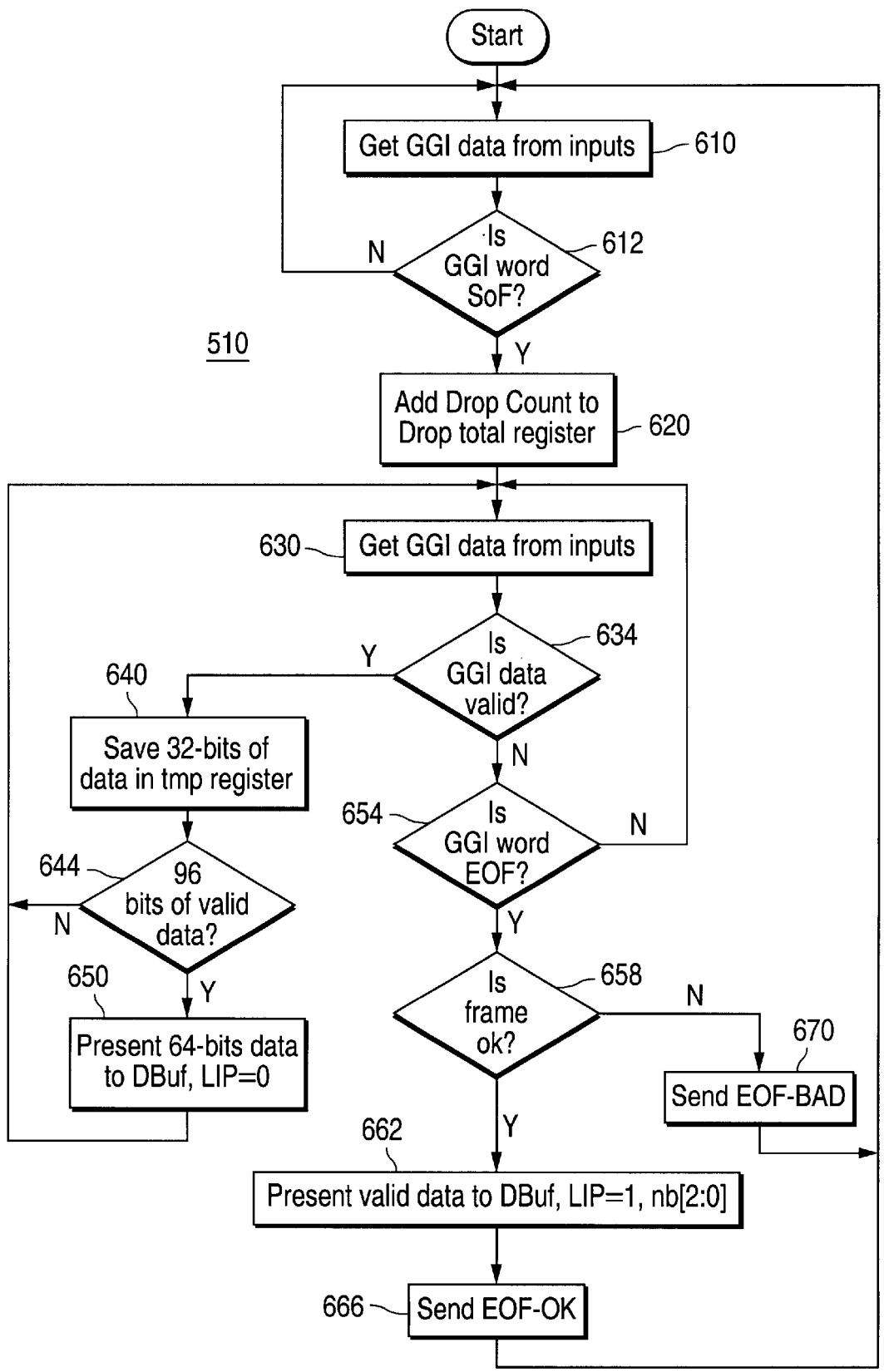
FIG. 6 is a flowchart illustrating the operation of the system of FIG. 5.

FIG. 6 illustrates GGI Rx Control block 510. At steps 610, 612, block 510 waits for a Start of Frame word SOF from GMAC 140 (RxSOF in Addendum 2). When SOF is received, block 510 adds the drop count from the SOF to the block's drop total register (step 620). The register is not shown. The contents of the drop total register are periodically sent to block 150EC via the message line MSGI. Block 150EC passes the total drop count to switch 144.

At step 630, block 510 gets the next 32 bits of data from the GMAC. If the data are valid (as indicated by signal rx_valid_described in Addendum 2), the data are saved in a temporary register (steps 634, 640). If block 510 has now accumulated 96 bits of valid data (step 644), the first 64 of the 96 bits are placed on the data bus 520 with LIP=0 (step 650). Also, block 510 asserts "data valid". If GGI Rx Control 510 has not accumulated 96 bits of valid data, no data are written to memory 410 because it is not yet known whether the data that have been accumulated are the last in the frame (and, therefore, whether LIP should be set). In either case, control returns to step 630.

If at step 634 the new 32 bits received from the GMAC are not valid data, block 510 checks whether the 32 bits are the end of frame control word EOF (RxEOF in Addendum 2). See step 654. The control words are identified by GMAC signal rx_c (Addendum 2). If the 32 bits are not EOF, control returns to step 630.

If at step 654 it is determined that the new bits are EOF, block 510 tests the error flags in the EOF word to determine if the frame is OK (step 658). If the frame is OK, those data bits that have been accumulated at step 640 but have not yet been written to the buffer 410 are now written to the buffer, with LIP=1 and with the three nb bits indicating the number of valid bytes (step 662). Also, EOF-ok is asserted to buffer write control 530 (step 666). Then control returns to step 610.

If at step 658 the frame is bad, EOF-bad is asserted to buffer write control 530 (step 670), and control returns to step 610.

The steps in the flowcharts herein are performed not necessarily in the order shown. For example, steps 662 and 666 overlap in some embodiments. Other steps may completely or partially overlap or be performed in a reverse order.

Figure 7:
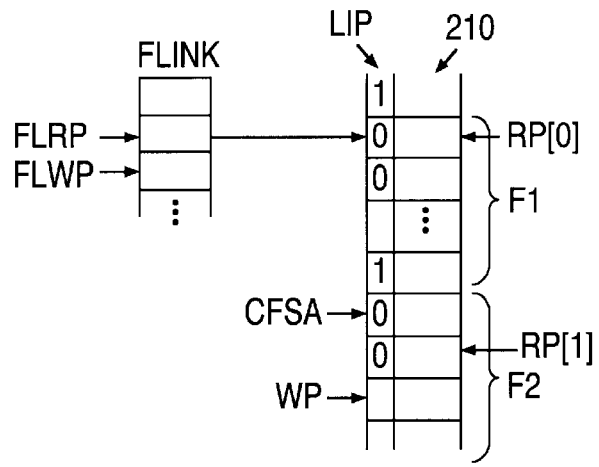
FIG. 7 illustrates data structures used in the system of FIG. 5.

FIG. 7 illustrates buffer write control 530 registers used to maintain the queue 210. The write pointer register WP points to (i.e., is the address of) the next 69-bit entry to be written in the queue. The current frame start address register (CFSA) points to the start of the current frame being written. In FIG. 7, frame F1 has been completely written into the queue, but frame F2 has not. CFSA points to the start of frame F2. Queue 210 is a circular queue in some embodiments.

Buffer write control 530 includes a circular frame link FIFO (FLINK) that stores pointers to the beginning of each frame. The pointers are in the order in which the frames are written to queue 210. Frame link write pointer (FLWP) register points to the bottom of the FLINK FIFO, that is, to the next entry to be written. In FIG. 7, this entry will be written with the address of the first word of frame F2 when, and if, the frame F2 will be successfully written in its entirety to queue 210.

Register FLRP (frame link read pointer) points to the top of the FLINK FIFO.

Figure 8:
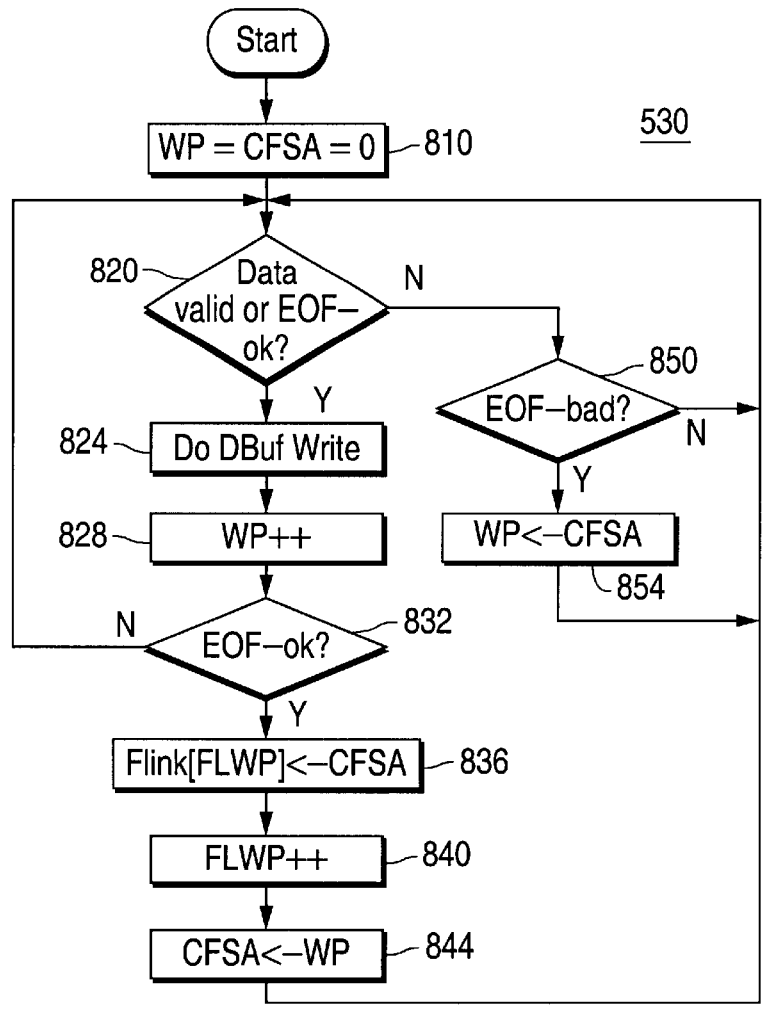
FIGS. 8–11 are flowcharts illustrating the operation of the system of FIG. 5.

FIG. 8 shows a write control 530 portion that writes data to queue 210. At step 810, the registers WP and CFSA are initialized to 0. Of note, queue 210 occupies one half of memory 410, corresponding to the most significant address bit 0. The remaining half is used by block 154EG. (In some embodiments, the memory is 32K×69 bits, with 15-bit addresses).

When signal "data valid" or "EOF-ok" is asserted by GGI Rx Control 510 (step 820), block 530 drives WP on the address bus of data buffer 410 and asserts the write enable signal WE to write the data buffer (step 824); this is done simultaneously with step 650 or 662 in FIG. 6). WP is incremented to point to the next queue entry (step 828). If EOF-ok was asserted at step 820 (see step 832), then:

1) the FLINK FIFO entry pointed to by FLWP is written with CFSA (step 836);
2) FLWP is incremented with wrap-around (step 840); and
3) CFSA is written with the value of WP to point to the start of the next frame to be received (step 844).

Control then returns to step 820.

If at step 820 the signal EOF-ok was deasserted, control from step 832 returns directly to step 820. Steps 836, 840, 844 are skipped.

If at step 820 "data valid" and "EOF-ok" were deasserted, and if "EOF-bad" was asserted by GGI Rx Control 510 (step 850), then WP is written with the value of CFSA to discard the bad frame in queue 210. Control then returns to step 820.

If "EOF_bad" was deasserted at step 850, control from step 850 returns directly to step 820.

Figure 9:
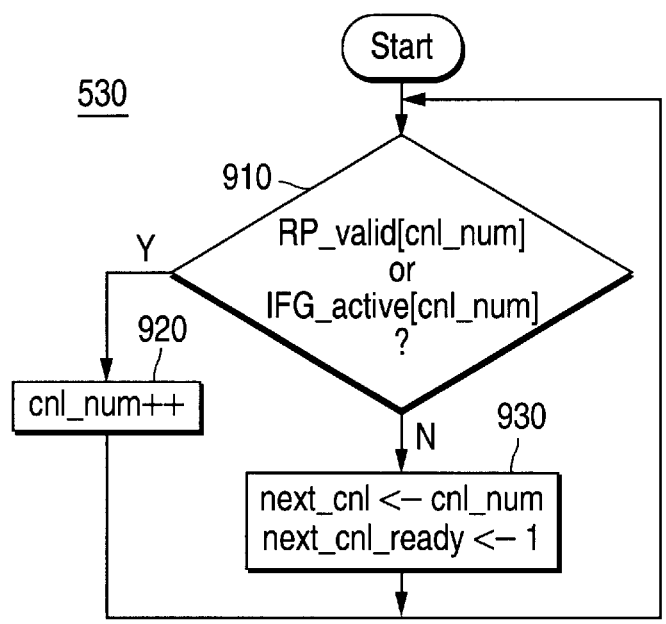
Figure 11:
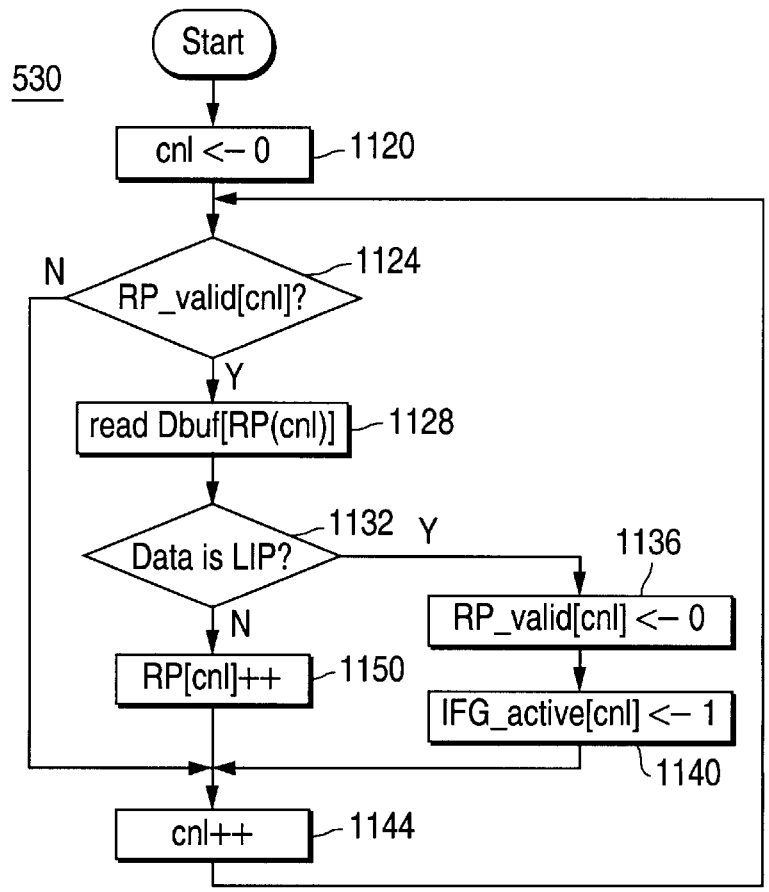
Figure 10:
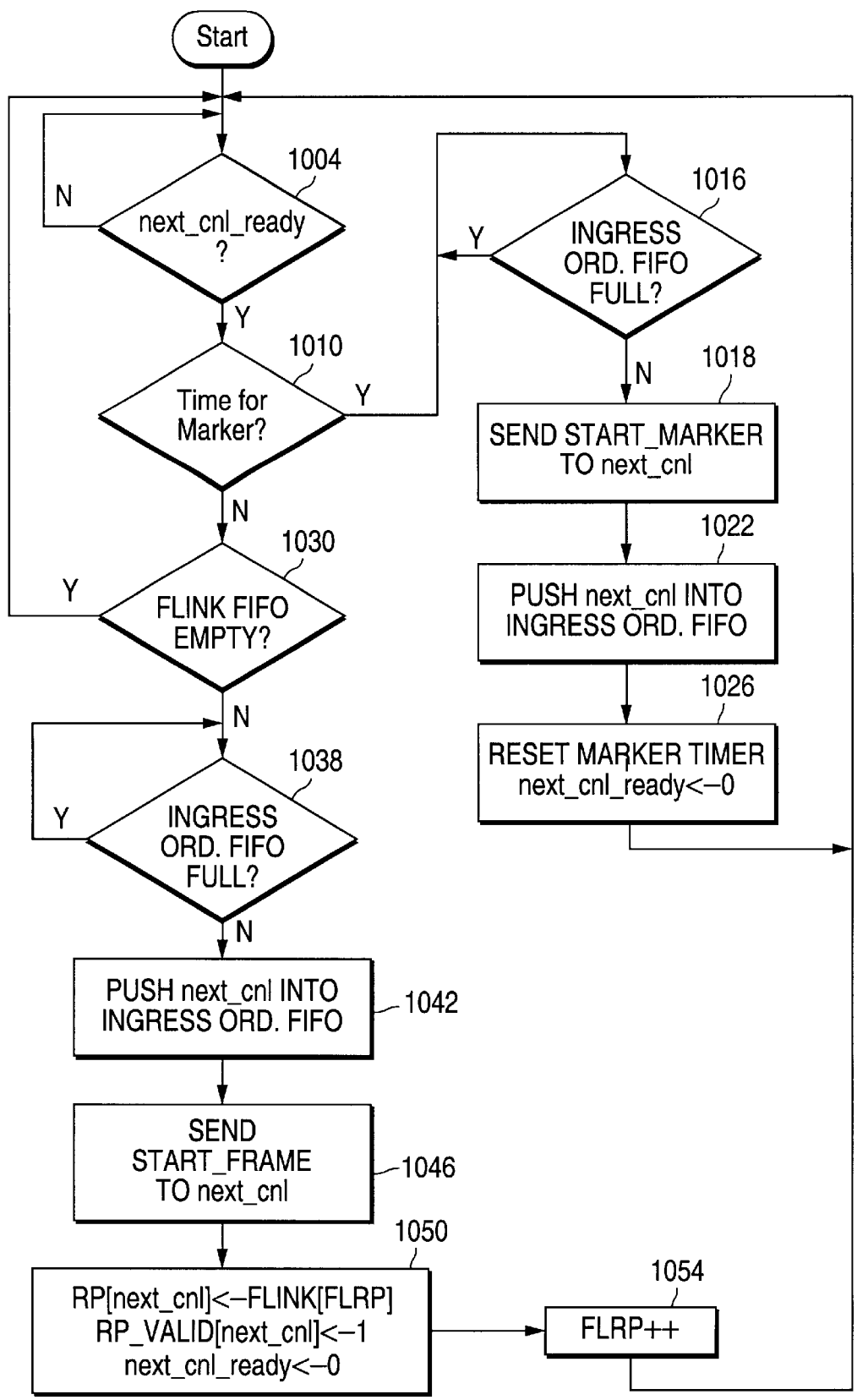

FIGS. 9–11 illustrate a block 530 portion that reads frames from queue 210 to MII Rx Control blocks 540. For each channel 160I.x, block 530 has the following registers:

(1) RP[x] points to the next entry in queue 210 to be written to the channel 160I.x (FIG. 7).
(2) RP-valid[x] indicates whether RP[x] is valid. When no frame is being written to the channel 160I.x, RP[x] is invalid.
(3) IFG_active[x] indicates whether the interframe gap is being transmitted on the channel 160I.x by the respective MII Rx Control 540. In some embodiments, this register is part of respective block 540, and block 540 provides a CHANNEL_READY signal to block 530 to indicate the state of IFG_active.

FIG. 9 illustrates selection of the next channel 160I.x to which the next frame will be written. The FIG. 9 channel selection logic is performed in a single 31.25 MHz clock cycle in some embodiments. Register "cnl_num" stores a variable channel number.

At step 910, if RP_valid[cnl_num] indicates a valid RP, or if IFG_active[cnl_num] is asserted indicating that transmission of an interframe gap is taking place on the channel, the channel is unavailable. Therefore, cnl_num is incremented (modulo 8, and thus with wrap around) at step 920, and step 910 is repeated for the next channel. This continues until an available channel is found or all the 8 channels are found to be unavailable.

If at step 910 the register RP_valid[cnl_num] indicates an invalid RP and IFG_active[cnl_num] is deasserted, then the register next_cnl receives the value of cnl_num, and the flag next_cnl_ready is set (step 930). This indicates that the next frame will be written to channel "next_cnl" (i.e., 160I.next_cnl).

FIG. 10 illustrates a frame dispatch control circuit which is part of buffer write control block 530. At step 1004 the circuit checks if the next_cnl_ready flag is set. If not, the circuit waits or the flag to be set (by step 930 of FIG. 9).

Figure 5:
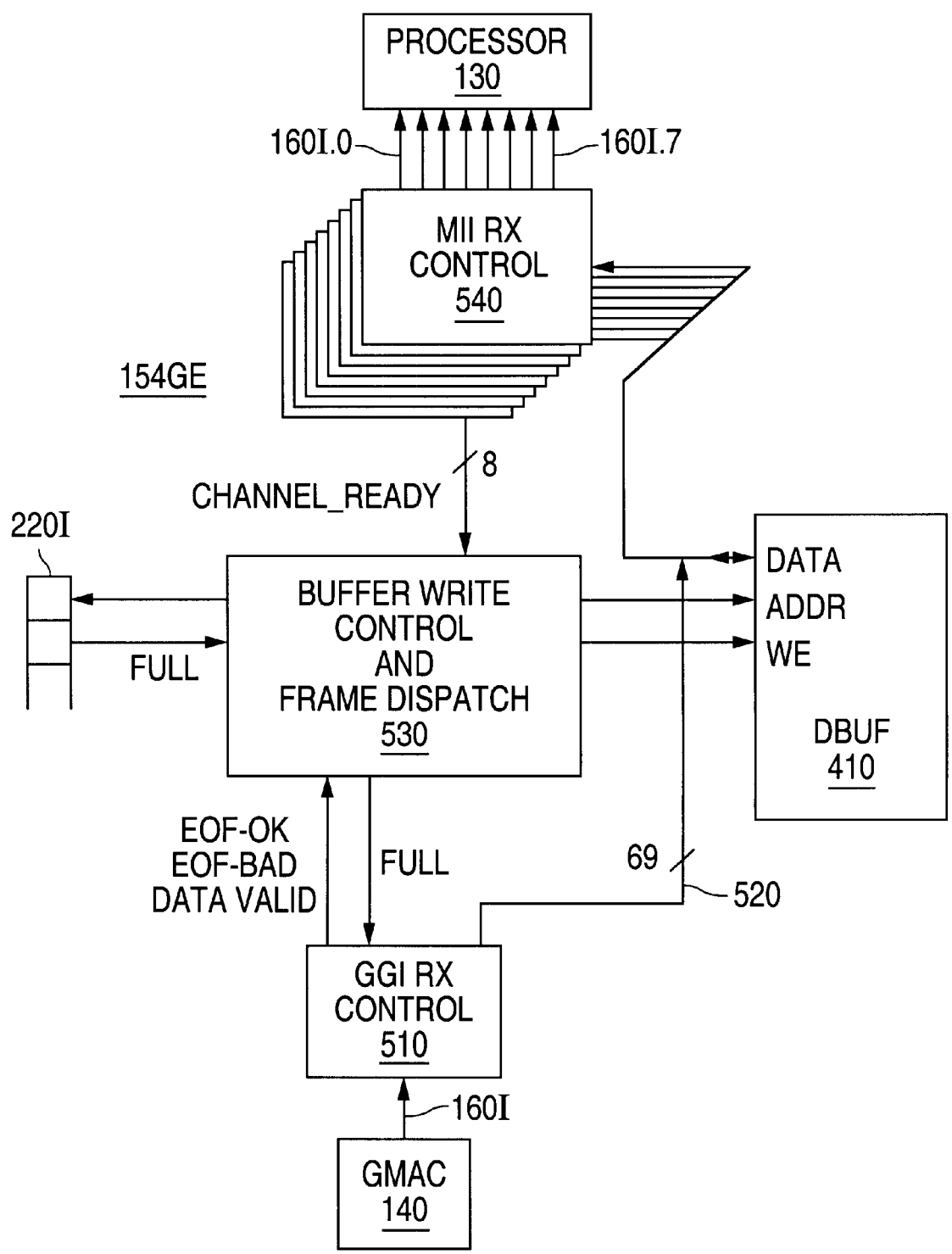
FIG. 5 is a block diagram of a portion of the system of FIG. 4.

At step 1010, the circuit checks whether it is time to send a marker frame on channel next_cnl. This is done using a marker timer (not shown) which measures 1024 switch cycles between ingress marker frames (each switch cycle is 68 cycles of 25 MHz clock). A separate marker timer is provided for each channel. If the timer for next_cnl has expired, a marker frame is transmitted on the channel. More particularly:

1) The circuit checks (step 1016) whether the ingress ordering FIFO 220I is full (as indicated by the FIFO "full" output, see FIG. 5). If the FIFO is full, the circuit waits for the full condition to go away.
2) A "start_marker" signal is sent to the MII RX Control block 540 for the channel next_cnl (step 1018).
3) The channel number next_cnl is pushed into the ingress ordering FIFO 220I, with the M bit set (step 1022).
4) The corresponding marker timer is reset, and next_cnl_ready is set to 0 (step 1026).

Then control returns to step 1004.

If at step 1010 the marker timer has not expired, the circuit checks whether the FLINK FIFO of FIG. 7 is empty (step 1030). The empty condition is FLRP=FLWP. If the FIFO is empty, control returns to step 1004. If not, the circuit checks at step 1038 whether the ingress ordering FIFO is full. If so, the circuit waits for the full condition to go away (as in step 1016).

Then the circuit performs the following actions:

1) The contents of the next_cnl register are pushed into the ingress ordering FIFO 220I, with the marker bit reset (step 1042);
2) A "start_frame" signal (step 1046) is asserted to the MII Rx Control block 540 that corresponds to the next_cnl value, to cause the block 540 to start sending the preamble on the corresponding ingress channel. The frame data will be read from data buffer 410 within 16 cycles of a 31.25 MHz clock (data are needed in 24 cycles)
3) RP[next_cnl] receives the value of FLINK[FLRP] (step 1050);

4) RP_valid[next_cnl] is set;

5) next_cnl_ready is reset;

6) The register FLRP is incremented (step 1054).

Then control returns to step 1004.

FIG. 11 illustrates a data buffer read control circuit which is part of block 530. At step 1120, a channel number register cnl is initialized to 0. If RP_valid[cnl] is set (step 1124), block 530 drives RP[cnl] on the address lines of data buffer 410 and generates control signals to read the data buffer (step 1128). When the data are read out to bus 520, block 530 checks the LIP flag on the bus (step 1132). If the LIP flag is set, the flag RP_valid[cnl] is reset (step 1136), and IFG_active[cnl] is set to signal to the respective MII Rx Control 540 to start the interframe gap (step 1140). (If flag IFG_active is part of block 540, a signal is set to block 540 to set IFG_active and start the interframe gap.) At step 1144, register cnl is incremented (modulo 8), and control returns to step 1124.

If at step 1132 the LIP flag is reset, the read pointer RP[cnl] is incremented (with wrap around). See step 1150. Step 1144 is performed, and control returns to step 1124.

If at step 1124 the flag RP_valid[cnl] is reset, control is passed directly to step 1144.

Figure 12:
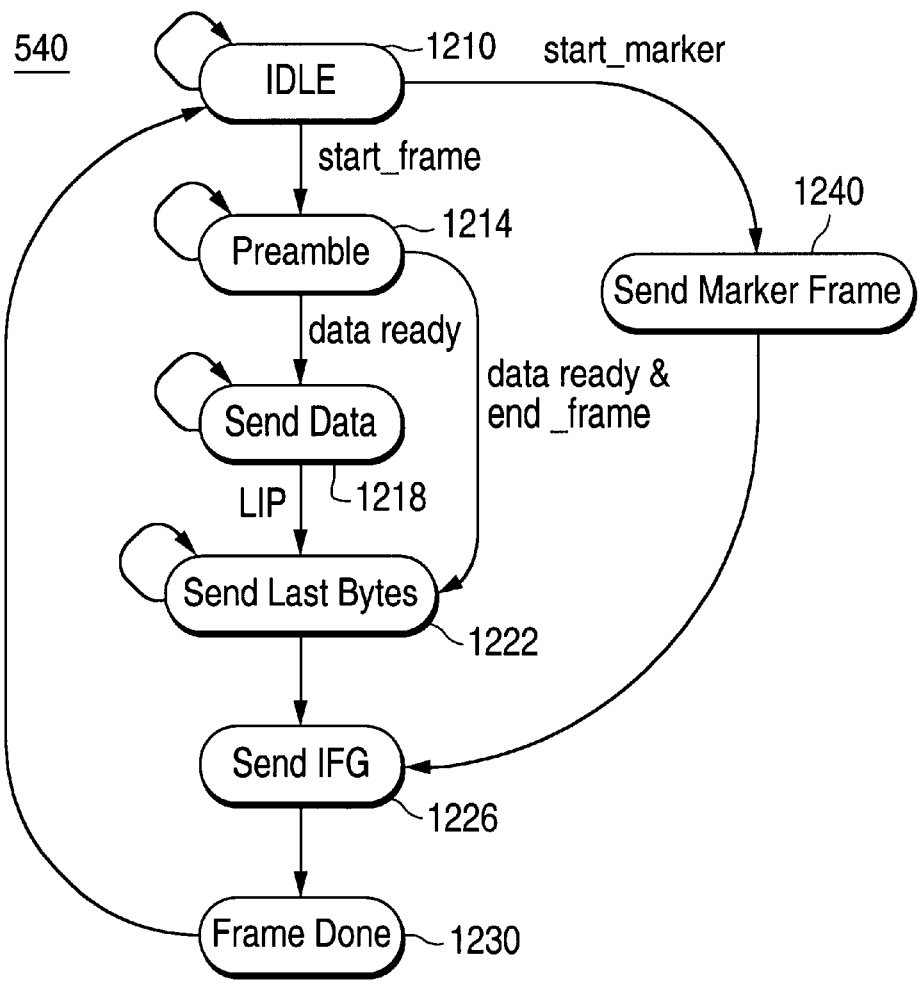
FIG. 12 is a state transition diagram for a portion of the system of FIG. 5.

FIG. 12 is a state diagram of one MII Rx Control block 540 (the eight blocks are identical). Transition form IDLE state 1210 to Preamble state 1214 occurs on receipt of the start_frame signal at step 1046 in FIG. 10. In the Preamble state, MII Rx Control 540 transmits the preamble to the processor 130.

When "data ready" is received from block 530, block 540 reads the data from memory data bus 520 and transmits the data to respective processing channel 134 (state 1218). When the LIP flag is set on the data bus, block 540 goes to state 1222. In that state, the MII Rx Control 540 transmits the last bytes as was shown by the nb bits of the data bus, and then goes to state 1226 to transmit the interframe gap. When this is done, transition to state 1230 is performed, and then back to the IDLE state 1210.

If in state 1214 the MII Rx Control 540 detects "data ready" and LIP=1 simultaneously, transition to state 1222 is performed directly, bypassing the state 1218.

If in the IDLE state 1210 the MII Rx Control 540 receives the "start_marker" signal (asserted at step 1018 in FIG. 10), the MII Rx Control transmits a marker frame in state 1240, and then goes to state 1226.

Block 154EG

Figure 13:
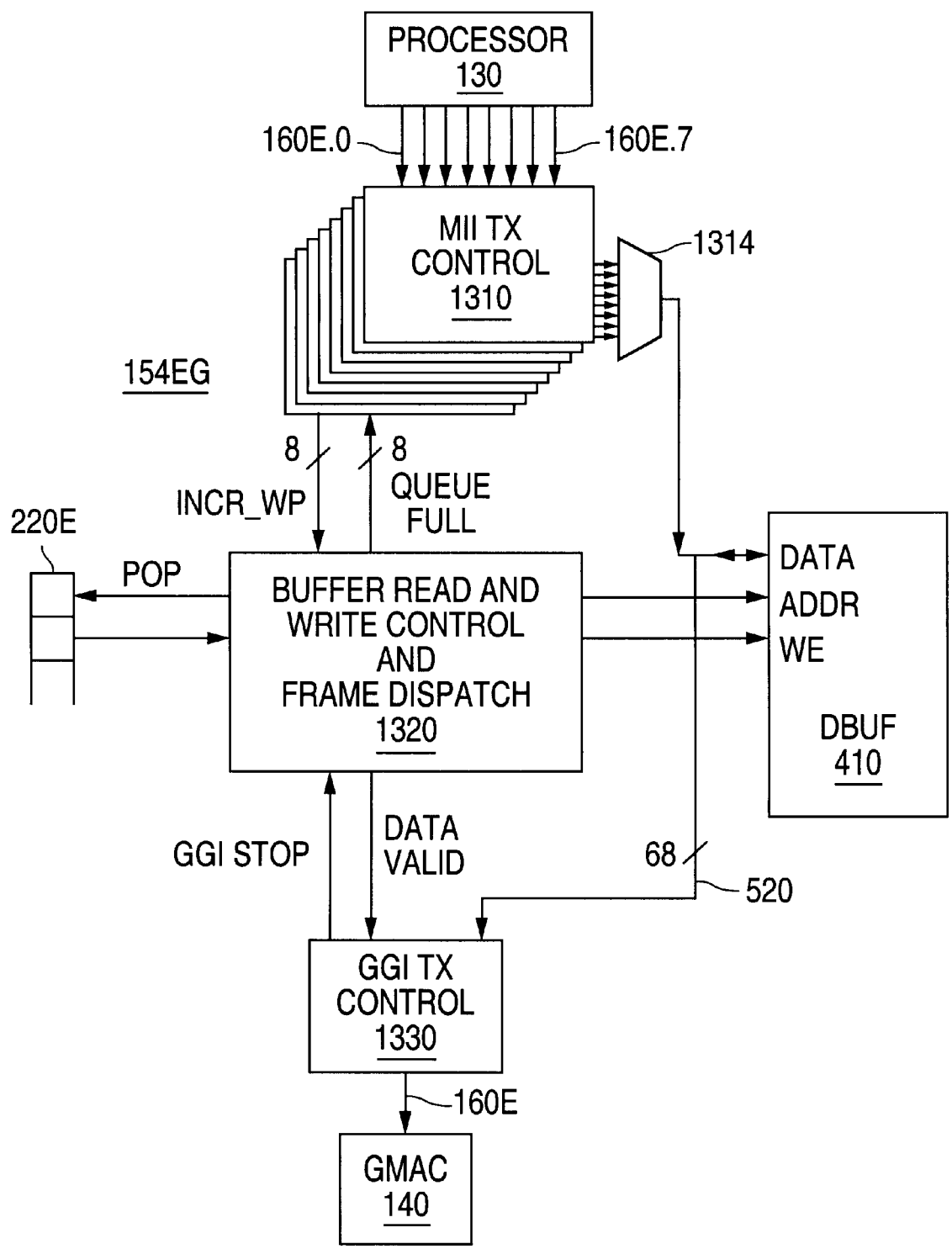
FIG. 13 is a block diagram of a portion of the system of FIG. 4.

FIG. 13 illustrates block 154EG. Data from processor 130 are received by MII Tx Control blocks 1310. One MII Tx Control block 1310 is provided for each egress channel 160E.x. Multiplexer 1314 multiplexes the data from different blocks 1310 onto the data bus 520 of data buffer 410. Writing and reading the data buffer on behalf of block 154EG is controlled by Buffer Read and Write Control and Frame Dispatch block 1320 which provides the address and control signals (including WE) to the data buffer. Block 1320 also reads the egress ordering FIFO 220E.

Frames from the data buffer are read to GGI Tx Control block 1330 which forwards them to GMAC 140.

Figure 14:
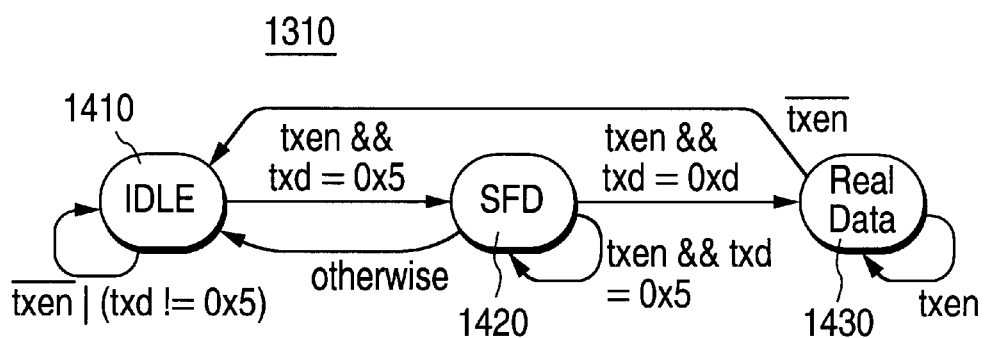
FIG. 14 is a state transition diagram for a portion of the circuit of FIG. 13.

FIG. 14 illustrates the state machine for a single MII Tx Control block 1310. Block 1310 waits for the condition that the MII transmit enable signal txen is asserted by respective processing channel 134.x, and the starting delimiter or delimiters arrive on the respective channel 160E.x (states 1410, 1420). The starting delimiter is 5D hexadecimal. When that condition occurs, block 1310 receives data from the channel 160E.x and writes the data to the respective queue 244.x (FIG. 2) in data buffer 410 (state 1430).

For each queue 244.x, block 1320 has the following registers:

(1) RP[x] is the read pointer;

(2) WP[x] is the write pointer pointing to the start of the frame being written to the queue;

(3) WP_tmp[x] is a temporary write pointer pointing to the next 69-bit entry to be written in the queue.

In state 1430, block 1310 writes 69-bit words each of which includes 64 bits of data, an LIP flag, three nb bits, and an M bit indicating whether the frame is a marker frame. Block 1310 recognizes the marker frames by the Ethernet source address SA=0xFFFFFFFFFFFF (Addendum 1). Block 1310 asserts INCR_WP (FIG. 13) to cause the block 1320 to increment WP_tmp[x]. The LIP flag is kept reset unless the last data bytes are being written. Block 1310 recognizes the last bytes from txen becoming deasserted. When block 1310 writes the last bytes, it sets LIP to 1 and the nb bits to the number of valid bytes being written. Also at that time, WP[x] is set to the value of WP_tmp[x].

If the queue 244.x becomes full during any write operation, block 1320 asserts the respective signal "Queue full" to respective MII Tx Control 1310.

Figure 15:
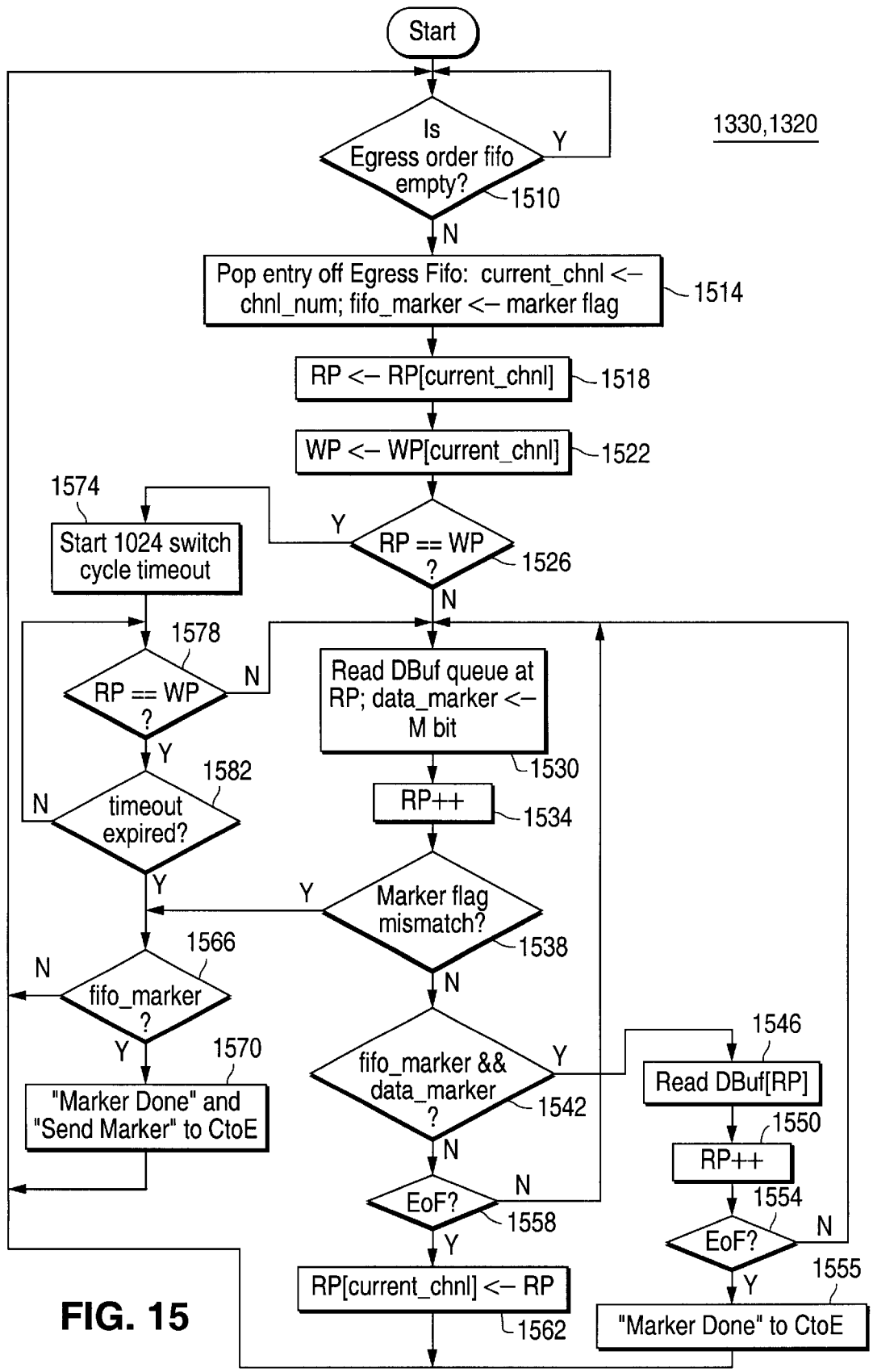
FIG. 15 is a flowchart illustrating operation of the system of FIG. 13.

FIG. 15 illustrates frame transmission by GGI Tx Control 1330 and block 1320. At step 1510, block 1320 waits for the ordering FIFO 220E to become non-empty if the FIFO is empty. Then block 1320 pops the ordering FIFO at step 1514. The channel number from the ordering FIFO is stored in register current_chnl, and the marker bit in register fifo_marker. A temporary register RP receives the value of RP[current_chnl] (see step 1518). A temporary register WP receives the write pointer value WP[current_chnl] (step 1522).

If the queue 244.current_chnl is not empty (step 1526), the queue entry pointed to by RP is read out to bus 520 (step 1530). The M bit of the entry is read into register "data_marker". RP is incremented (step 1534). If the marker bits fifo_marker and data_marker coincide (step 1538) and the frame is a marker frame as indicated by these bits (step 1542), then the queue is read again (step 1546) and RP is again incremented (step 1550). If the data read out have the LIP bit set (step 1554), then the MD.E[current_chnl] ("marker done") is asserted to block 150CE (step 1555), and control returns to step 1510. If the LIP bit is reset, control goes to step 1530.

If at step 1542 the frame is not a marker frame, and the LIP bit is reset (step 1558), control returns to step 1530. If at step 1558 the LIP bit is set, then RP[current_chnl] receives the value of RP (step 1562), and control returns to step 1510.

If at step 1538 the marker flags in the ordering FIFO and the frame mismatch, steps 1566 and 1570 are performed to implement the cases 3 and 4 in Table 1.

More particularly, if the marker flag is set in the ordering FIFO entry (step 1566), then MD.E[current_chnl] and SM.E[current_chnl] are asserted (step 1570) and control returns to step 1510. If the ordering FIFO entry marker bit is reset, step 1570 is skipped, and control returns to step 1510.

If at step 1526 the queue 244.current_chnl is empty, then a timer is started at step 1574 to measure 1024 switch cycles. If the queue becomes non-empty while the timer is running (step 1578), control goes to step 1530. If the timer expires with the queue empty (step 1582), it is assumed that the frame corresponding to the ordering FIFO entry was dropped by processor 130, and control goes to step 1566.

Block 150EC

For each ingress channel 160I.x, block 150EC includes a circuit 1610.x (FIG. 16) which receives ATM cells on that channel and stores them in data buffer 420. Circuit 1610.x includes the following registers:

(1) WP[x] is a 9-bit write pointer to the data buffer location starting which the next frame is to be written. In the embodiment being described, the data buffer 420 addresses ADDR are 15 bits long. Address MSB ADDR[14] is 0 for block 154EC, and 1 for block 154CE. For block 154CE, address bits ADDR[13:11] indicate the channel number x (0 to 8). Each cell is stored in four consecutively addressed locations. Each location is 108 bits wide to store:
   (a) 96 bits (one quarter) of the cell payload, and
   (b) 12 bits which contain either a part of the cell header (for the first three quarters of a cell) or the cell's 12-bit parity (for the last quarter).

Thus, the two least significant bits ADDR[1:0] of the address are an index of a cell quarter within a cell. WP[x] is nine bits ADDR[10:2] of the address.

(2) WP_tmp[x] is an 11-bit temporary pointer (address bits [10:0]) to the data buffer location into which the next quarter of a cell will be written.

(3) RP[x] is a read pointer (bits [10:0]);

(4) chnl_full[x] is a channel full flag. This flag is set when respective queue 236.x becomes full. The arriving cells will be discarded. If any cell of a frame has been discarded, the flag is not reset until the entire frame has been discarded.

On reset, the registers WP, WP_tmp, RP, chnl_full are initialized to zero.

Figure 16:
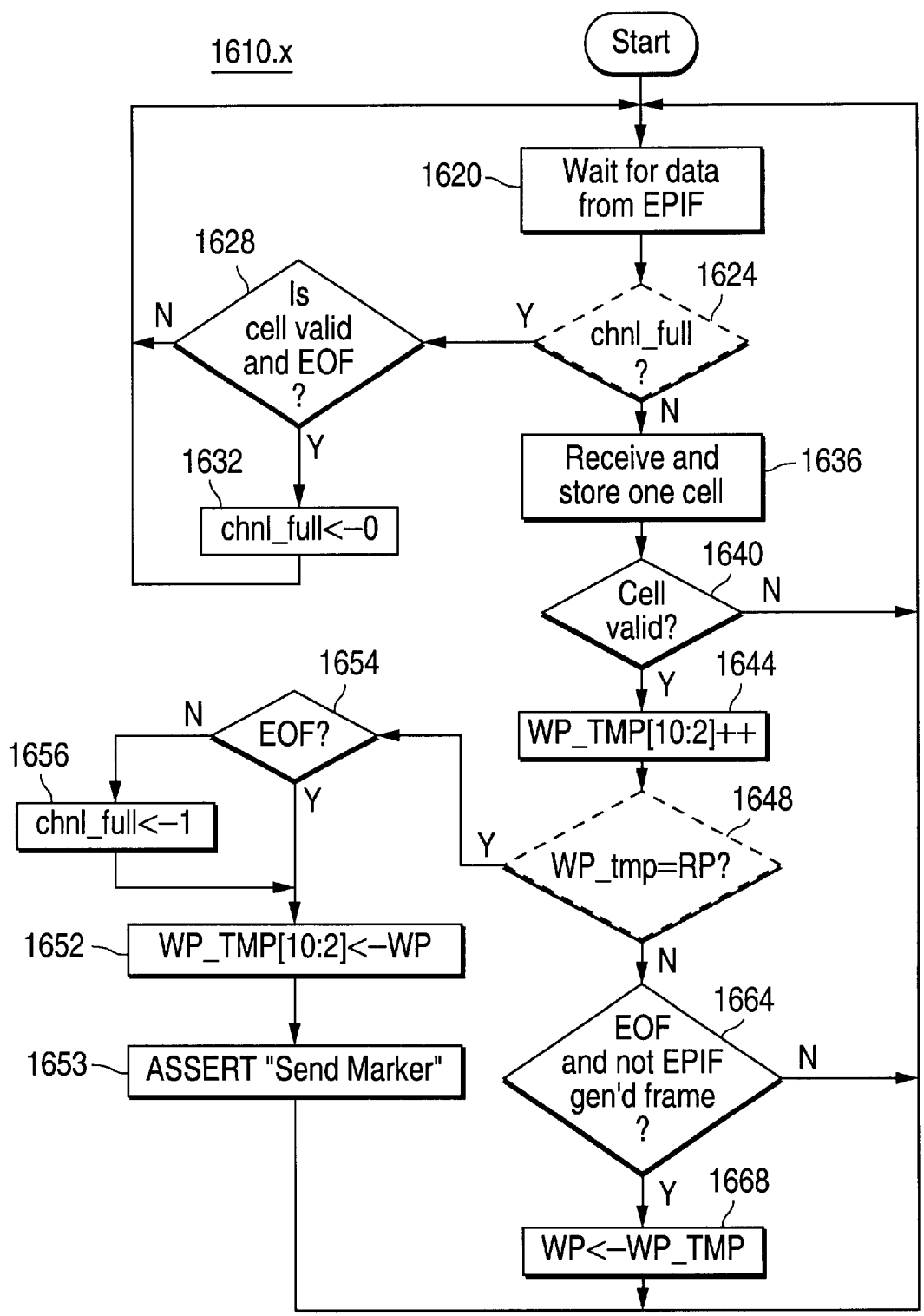
FIG. 16 is a flowchart illustrating operation of the system of FIG. 4.

In FIG. 16 the channel number "x" is sometimes omitted since all the registers refer to the same ingress channel.

Circuit 1610.x waits for data from the respective channel 160I.x at step 1620. When a cell header starts arriving on the channel (see Addendum 3), chnl_full is checked at step 1624. Step 1624 is shown in dashed lines to indicate that this step is omitted in some embodiments in which the data buffer 420 is sufficiently large to make a channel full condition impossible. In such embodiments, the registers chnl_full are omitted.

If the channel is full, the cell header is tested to determine if the cell is valid and if the cell is the last cell in a frame (step 1628). The last cell in a frame is identified by PTI[0]=1 and PTI[2]=0. If the cell is valid and is the last in a frame, chnl_full[x] is reset (step 1632), and control returns to step 1620. If the cell is not valid or is not the last cell in a frame, control from step 1628 passes directly to step 1620, and step 1632 is omitted. In both cases, the cell is discarded.

If at step 1624 the channel is not full, the cell is read and stored in the data buffer 420 (step 1636). The cell is stored in quarters as described in Addendum 3. Register WP_tmp provides the write address for the data buffer during this operation. This register is incremented as needed as the cell is being stored. Register WP remains unchanged.

If the cell is not valid (step 1640), control returns to step 1620. Of note, when the cell was stored at step 1636, only the two least significant bits of WP_tmp (the cell quarter index) were incremented. They were incremented four times (one time for each cell quarter, and hence they remain at zero at the completion of step 1636.

If the cell is valid at step 1640, WP_tmp[10:2] is incremented (step 1644). If WP_tmp equals RP (step 1648), the queue became full when the cell was written. In that case, the cell is discarded, so that there is always room for an incoming cell in the data buffer. Discarding the cell is accomplished by resetting the pointer WP_tmp[10:2] to the value of WP (step 1652). Signal SM.I[x] is asserted to have another marker frame sent on the channel (step 1653) since discarding the frame may result in frame ordering violation. Further, if the cell was not the last cell in a frame (step 1654), the flag chnl_full is set (step 1656) to discard the remainder of the frame. Then control returns to step 1620.

Dashed lines in step 1648 indicate that this step may be omitted if the data buffer is large enough to make a channel full condition impossible.

If at step 1648 the register WP_tmp is not equal to RP, the following operation is performed. If the cell is the last in a frame and the frame is not one generated by processor 130 (step 1664), the WP register receives the value of WP_tmp (step 1668). (The frames generated by processor 130 are recognized by VPI[7]=1. Setting VPI[7] to 1 is accomplished by suitably programming the processor 130.) Then control returns to step 1620. The cell is not discarded in this case.

If at step 1664 the cell is not the last in a frame or the cell is generated by processor 130, step 1668 is skipped, and control returns to step 1620. Thus, the cell will be discarded if a subsequent cell in the frame is discarded due to a channel full condition. Hence, when a cell is discarded, all the cells in the same frame are also discarded, and if the immediately preceding frame was generated by processor 130, this frame is also discarded.

In the embodiment of FIG. 17, switch 144 is built from chip set ATMS2000 or MSC available from MMC Networks of Sunnyvale, Calif. Some features of the chip sets are described in U.S. Pat. No. 5,732,041 issued Mar. 24, 1998 to A. Joffe and incorporated herein by reference, and in U.S. patent application Ser No. 08/959,636 filed Oct. 28, 1997 by A. Joffe et al., now U.S. Pat. No. 6,170,046, issued on Jan. 2, 2001 and incorporated herein by reference. In particular, the switch includes a switch controller 1710, shared memory 1720, and memory buffer (MBUF) 1730. The 1.2 Gbps port 118 is implemented by eight 12-bit parallel ports 118.0, 118.1, . . . 118.7 running at 25 MHz. These MBUF ports are connected to respective output ports 118I.0, . . . 118I.7 of block 150CE and to respective input ports 118E.0, . . . 118E.7 of block 150EC.

In the embodiment of Addendum 3, pairs of ports 118I are tied together (i.e., they share the same pins of block 150EC), and they run at 50 MHz. Pairs of ports 118E are also tied together to run at 50 MHz.

For each port 118.x, a serial header line hdr[x] connects the switch controller 1710 to block 150CE and block 150EC. The header lines carry cell headers. The MBUF block 1730 transfers cell payloads.

Separate header lines (not shown) carry headers between processor 130 and blocks 150CE, 150EC.

Each cell payload is transferred through a single one of ports 118.x. Eight cells (i.e., cell payloads) are transferred in parallel through the eight ports 118.x to or from the switch in the same direction. The first 12 bits of the payload of each of the eight cells are transferred in parallel in the same clock cycle, the second 12 bits are transferred in parallel, and so on. However, the switch and the blocks 150EC, 150CE treat the cells as if they were transferred serially at 1.2 Gbps.

For eight cells transferred in parallel, the first cell in the serial cell flow 160I or 160E is the cell on port 118.0, the second cell is the cell on port 118.1, and so on.

Cells from different frames can appear on ports 118.x at the same time.

Figure 18A:
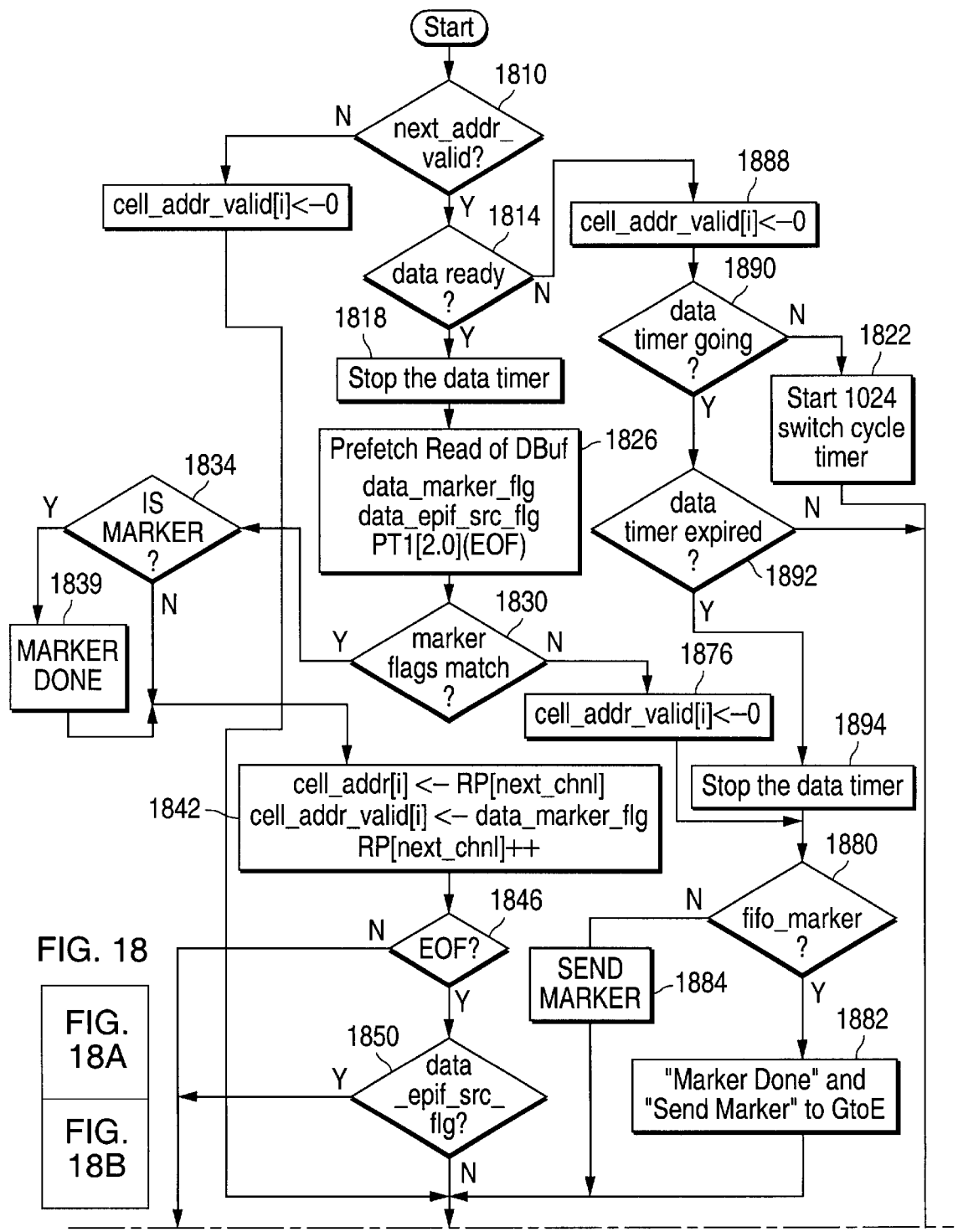
Figure 18B:
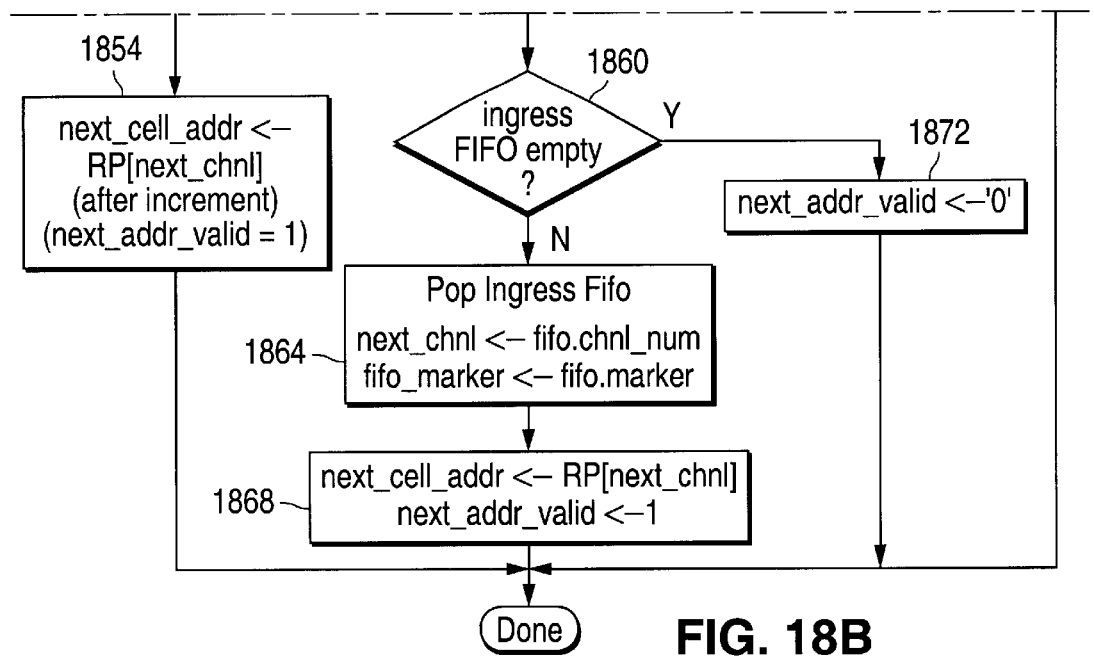

In each switch cycle, block 150EC performs eight prefetch reads of data buffer 420 to determine which eight cells should be transmitted on respective ports 118I.0, . . . 118I.7 in the next switch cycle. The pipeline flow for this operation for a single port 118I.i is illustrated in FIG. 18. Eight such flows are performed in each switch cycle.

The logic of FIG. 18 uses the following registers in block 150EC:

(1) cell_addr[0], . . . cell_addr[7] store addresses of cells to be transmitted on the respective ports 118I.0, . . . 118I.7;

(2) cell_addr valid[0:7] are valid bits; cell_addr_valid[i] is a valid bit for cell_addr[i];

(3) next_chnl is the channel number (i.e. the number x of queue 236.x) from which the cell in the next prefetch will be transmitted; the channel number forms bits [13:11] of the next prefetch read address for data buffer 420;

(4) next_cell_addr (cell address) forms read address bits [10:2] for the next prefetch; for each pipeline flow of FIG. 18 the cell address next_cell_addr is selected at the end of the previous flow (which may or may not be in the same switch cycle; see step 1868; thus the previous flow prefetch may or may not relate to the same group of cells transmitted in parallel on ports 118I);

(5) next_addr_valid is the valid bit for the pair (next_chnl, next_cell_addr);

(6) fifo_marker gets the marker bit 228 (FIG. 2) popped off the ingress ordering FIFO 220I;

(7) data_marker_flg indicates if the cell is part of a marker frame;

(8) data_epif_src_flg indicates if the cell is part of a frame generated by processor 130.

Also, a data timer (not shown) is used to time the queue-empty conditions.

In FIG. 18, if next_addr_valid is true (step 1810), and the data in queue 236.next_chnl is ready (i.e. RP[next_chnl] is not equal to WP[next_chnl]; see step 1814), then the queue-empty data timer is stopped if it was running (step 1818). A prefetch read of data buffer 1420 (step 1826) is performed at the address {next_chnl, next_addr, 2'b10} (2'b10 is binary 10) to read the first 96 bits of the cell payload and the first 12 bits of the cell header. The prefetch reads are shown as PF in Table 3—3 of Addendum 3 (see, for example, "PF0" for FCLK cycle 6 in Table 3—3). The flag data_marker_flg is set to VPI[10]. The flag data_epif_src_flg is set to VPI[7]. PTI[2,0] show if the cell is the last in a frame (EOF condition).

If fifo_marker=data_marker_flg (step 1830;

fifo_marker was read in the previous pipeline flow, as described below), the following operations are performed. If fifo_marker is set (step 1834), then the marker done flag MD.I[next_chnl] is asserted (step 1839). Further, whether or not fifo_marker is set, cell_addr[i] is set to RP[next_chnl] (step 1842), where "i" is the number of port 118I.i; also cell_addr_valid[i] is set to the inverse of data_marker_flg; and RP[next_chnl] is incremented. If the cell is not the last in a frame (step 1846), or if the cell is part of a frame generated by processor 130 (step 1850), then step 1854 is performed. At this step, next_cell_addr receives RP[next_chnl] (after RP[next-chnl] is incremented at step 1842). The register next_addr_valid remains set. The pipeline flow terminates.

If the cell is the last in a frame and the frame was not generated by processor 130 (steps 1846, 1850), the next frame should be prefetched. Step 1860 checks if the ingress ordering FIFO is empty. If not, the FIFO is popped (step 1864). Register next_chnl is set to the popped channel number, and fifo_marker is set to the popped marker bit. Also, next_cell_addr is set to RP[next_chnl], and next_addr_valid is set to 1 (step 1868). The pipeline flow terminates.

If the ingress ordering FIFO is empty, next_addr_valid is set to 0 (step 1872), and the pipeline flow terminates.

If at step 1830 the marker flags fifo_marker and data_marker_flg do not coincide, cell_addr_valid[i] is set to 0 (step 1876), where "i" is the number of port 118I.i. If fifo_marker is set (step 1880), the signals marker done MD.I and send marker SM.I are asserted for channel next_chnl (step 1882); if fifo_marker is not set, only the send marker signal is asserted for the channel (step 1884). In either case, control passes to step 1860 to initiate next frame transmission.

If at step 1814 the queue 236.next_chnl is empty, then cell_addr_valid[i] is reset (step 1888). If the queue-empty data timer is not going (step 1890), the timer is started (step 1822) to count 1024 switch cycles, and the current pipeline flow terminates. If the data timer is going and has not expired (step 1892), the pipeline flow also terminates. If the data timer has expired, it is stopped (step 1894) and control passes to step 1880 and eventually to step 1860 to initiate new frame transmission.

Block 150CE

Figure 19A:
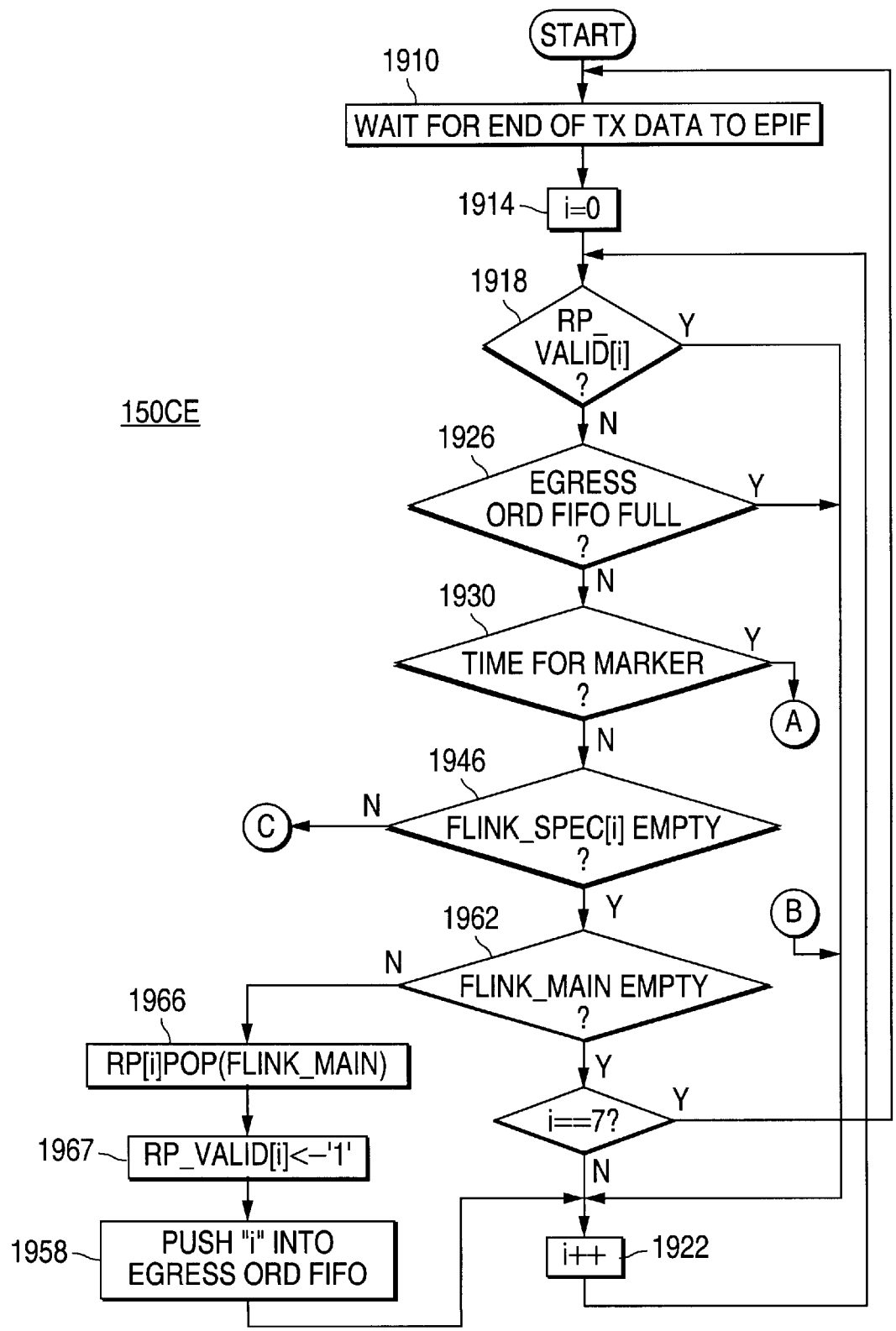

FIGS. 19A, 19B, 19C illustrate block 150CE circuitry that dispatches frames from queue 240 (FIG. 2) to egress channels 160E.i. The outside loop (starting at step 1910) is performed once for each channel 160E.x in each switch cycle.

At step 1910, the circuit of FIGS. 19A–19C waits for the end of transmission from block 150CE to processor 130. Transmission to processor 130 takes one half of each switch cycle, and receiving data from processor 130 takes the other half. The loop of FIGS. 19A–19C is performed once for each channel during the latter half of the switch cycle.

At step 1914, the channel number register i is initialized to zero. If the read pointer RP[i] for channel i is valid (step 1918), the channel is transmitting another frame. Therefore, at step 1922, the channel number i is incremented modulo 8, and control passes back to step 1918 to try the next channel.

If the read pointer is invalid at step 1918, and the egress ordering FIFO 220E is not full (step 1926), a check is performed to see if it is time to send a marker frame on channel i (step 1930). Block 150CE has a separate marker timer for each channel, and step 1930 checks the timer for channel i. If the timer has expired, the marker frame is sent on the channel (step 1934 in FIG. 19B), the channel number i is pushed into egress ordering FIFO 220E (step 1938), the marker timer is reset (step 1942), and control goes to step 1922.

If at step 1930 the marker timer has not expired, then a check is performed to see if the channel specific frame link FIFO (Addendum 4, part II) for channel i is empty (step 1946). Channel specific FLINK FIFOs keep track of frames whose destination is a channel 134.i, as described in Addendum 4. In the embodiment being described, channel specific FIFOs have priority over the regular traffic. If the FIFO is not empty, the FIFO is popped into register RP[i] (step 1950 in FIG. 19C). Also, RP_valid[i] is set (step 1954). Then control passes to step 1922.

If at step 1946 the channel specific frame link FIFO is empty for channel i, then a check is performed whether the main frame link FIFO (Addendum 4, part II) is empty (step

1962). This FIFO keeps track of frames to be transmitted to the Ethernet. If this FIFO is not empty, the FIFO is popped into the read pointer RP[i] for channel i (step 1966), RP_VALID[i] is set (step 1967), and the channel number i is pushed into the egress ordering FIFO (step 1958), with the FIFO marker bit reset. Control passes to step 1922.

If the main frame link FIFO is empty at step 1962, then a check is performed at step 1970 to see if i=7. If so, control passes to step 1910, to wait for the next switch cycle. If not, control passes to step 1922.

If the egress ordering FIFO is full at step 1926, control from step 1926 passes directly to step 1922.

The above embodiments illustrate but do not limit the invention. In particular, the invention is not limited by the number of channels, the type of networks involved, or by any particular circuitry. The invention is not limited to particular throughputs or clock rates. In some embodiments, the traffic through port 118 flows at the ATM physical layer or some other layer. In some embodiments, all processing channels 134.x are identical. In other embodiments, different channels 134 are implemented differently and possibly have different throughput. In some embodiments, each processing channel 134 is unidirectional (half-duplex). In some embodiments, flow 160I or 160E is not supported (only a unidirectional flow is supported). In some embodiments, only part of frames arriving on port 114 or 118 are processed by processor 130; other frames are not processed by the processor, and may be forwarded to some other port which does not require any processing. The invention is not limited to FIFOs or FIFO implementations or to any other data structures. For example, non-circular FIFOs are used in some embodiments. Other embodiments and variations are within the scope of the invention, as defined by the appended claims.

Addendum 1

Marker Frame Format

Both ingress and egress marker frames have the Ethernet source address SA=FFFFFFFFFFFF. EtoG block 154EG recognizes egress marker frames by this address.

PIF processor 130 is programmed to assign to ingress marker frames a VPI having VPI[10]=1, which is how the EtoC block 150EC recognizes the marker frames.

In some embodiments, each ingress marker frame is as shown in the following table 1—1:

TABLE 1-1

| Ingress Marker Frame | | |
|---|---|---|
| Frame Section | Number of bytes | Value (hexadecimal) |
| Destination Address | 6 | 0000_0000_0000 |
| Source Address | 6 | FFFF_FFFF_FFFF |
| Type | 2 | 0800 |
| data | 1 | 00 |
| CRC | 4 | CE1EEA2B |

Addendum 2

GMAC Interface

The following Table 2-1 describes the signals

TABLE 2-1

| Signal name | Width | Direction | Function |
|---|---|---|---|
| Clocks | | | |
| clk | 1 | System->GMAC | Synchronizes the Rx and Tx data transfers |
| Rx | | | |
| rx_data | 32 | GMAC->System | Rx data |
| rx_c | 1 | GMAC->System | Rx control. 1: Control word; 0: Data word |
| rx_p | 1 | GMAC->System | Rx Parity |
| rx_valid_ | 1 | GMAC->System | Rx data valid. 0: Valid; 1: Not valid |
| rx_full_ | 1 | System->GMAC | Rx full (back pressure) 0: System can not accept more Rx data; 1: System can accept Rx data |
| TX | | | |
| tx_data | 32 | System->GMAC | Tx Data |
| tx_c | 1 | System->GMAC | Tx control. 1: Control word; 0: data word |
| tx_p | 1 | System->GMAC | Tx Parity |
| tx_valid_ | 1 | System->GMAC | Tx data valid. 0: Valid; 1: Not valid |
| tx_full_ | 1 | GMAC->System | Tx full. 0: GMAC can not accept more Tx data. 1: GMAC can accept Tx data |
| Management | | | |
| reset_ | 1 | System->GMAC | Reset |
| mac_err | 1 | GMAC->System | General GMAC error |
| mdc | 1 | System->GMAC | Management clock |
| mdio | 1 | System->GMAC GMAC->System | Management data |

Control Words

Each control word is 32-bits wide. Some of the bits are described below.
1. Receive Control Words (i.e. Received from GMAC by System 110)
RxSOF (Rx Start Of Frame)
  RxSOF[31:28]=0001
  RxSOF[15:0] is the Drop Count which is the number of frames that were completely dropped by the GMAC prior to this frame.
RxEOF (Rx End Of Frame)
  RxEOF[31:28]=0010
  Some other bits show error conditions.
2. Transmit Control Words (i.e., Transmitted to GMAC by System 110)
TxSOF (Tx Start Of Frame)
  TxSOF[31:28]=0001
TxEOF (Tx End Of Frame)
  TxEOF [31:28]=0010
  Some other bits show error conditions. One bit 25 ("JAM") commands the GMAC to force a bad CRC frame to the Ethernet network.

Addendum 3

Timing for Data Transfers among Block 150, Processor 130, and Switch 144

In the tables below, "FCLK No." is the cycle number of a 50 MHz clock. A switch cycle consists of FCLK cycles 0–135.

"EPIF" refers to processor 130. "GMUX" refers to blocks 150, 154 or just to block 150 (only block 150 timing is described in this Addendum).

Port numbers i refer to ports 118.i or ports 134A (FIG. 1) of channels 134.i as appropriate. Pairs of ports are tied together to share the same pins. Thus, ports 118.0, 118.1 are tied together, ports 118.2, 118.3 are tied together, ports 118.4, 118.5 are tied together, and ports 118.6, 118.7 are tied together. Also, ports 134A of channels 134.0, 134.1 are tied together, ports 134A of channels 134.2, 134.3 are tied together, and so on.

In Table 3-1, the term "dij" (i =0, ... 7; j=0, ... 31) denotes the jth 12-bit data word of a cell payload transferred on port 118.i. For example, d10 is the first 12 bits of a payload transferred on port 118.1; d131 is the last 12 bits of a payload transferred on port 118.1.

Pi stands for parity on port 118.i (e.g., P0 is parity on port 0).

The cell header bits have the same meaning, and are transferred in the same order, as for the interfaces defined by the aforementioned chip sets ATMS2000 or MSC. Not all the header bits are shown. The F it on the header line means "port full".

Table 3-1

Data and Header Transfer on Ports 134A between Processor 130 (EPIF) and Block 150 (GMUX)

TABLE 3-1

Data and Header Transfer on Ports 134A between Processor 130 (EPIF) and Block 150 (GMUX)

| FCLK No. | Port 0/1 Data | Port 2/3 data | Port 4/5 Data | Port 6/7 Data | Headers | Comments |
|---|---|---|---|---|---|---|
| 131 | d130 | d330 | d530 | d730 | | GMUX to EPIF transfer on |
| 132 | d031 | d231 | d431 | d631 | VPI[10] | data lines, EPIF |
| 133 | d131 | d331 | d531 | d731 | | to GMUX |
| 134 | P0 | P2 | P4 | P6 | VPI[9] | on header lines |
| 135 | P1 | P3 | P5 | P7 | | |
| 0 | d00 | d20 | d40 | d60 | VPI[8] | EPIF to GMUX |
| 1 | d10 | d30 | d50 | d70 | | transfer on data |
| 2 | d01 | d21 | d41 | d61 | VPI[7] | lines |
| 3 | d11 | d31 | d51 | d71 | | begins, on |
| 4 | d02 | d22 | d42 | d62 | VPI[6] | header lines |
| 5 | d12 | d32 | d52 | d72 | | continues |
| 6–15 | ... | ... | ... | ... | ... | |
| 16 | d08 | d28 | d48 | d68 | VPI[0] | |
| 17 | d18 | d38 | d58 | d78 | | |
| 18 | d09 | d29 | d49 | d69 | VCI[15] | |
| 19 | d19 | d39 | d59 | d79 | | |
| 20 | d010 | d210 | d410 | d810 | VCI[14] | |
| 21–61 | ... | ... | ... | ... | ... | VCI [13:0] PTI[2:0], CLP, V (valid) and I (interrupt) are transferred on header lines during these cycles |
| 62 | d031 | d231 | d431 | d631 | | |
| 63 | d131 | d331 | d531 | d731 | | |
| 64 | P0 | P2 | P4 | P6 | | |
| 65 | P1 | P3 | P5 | P7 | VPI[11] | GMUX to EPIF transfer on header lines begins |
| 66–69 | | | | | VPI[10], VPI[9] | No EPIF to GMUX or GMUX to EPIF transfer on data |

TABLE 3-1-continued

Data and Header Transfer on Ports 134A between Processor 130 (EPIF) and Block 150 (GMUX)

| FCLK No. | Port 0/1 Data | Port 2/3 data | Port 4/5 Data | Port 6/7 Data | Headers | Comments |
|---|---|---|---|---|---|---|
| 70 | d00 | d20 | d40 | d60 | | lines GMUX to EPIF |
| 71 | d10 | d30 | d50 | d70 | VPI[8] | transfer |
| 72 | d01 | d21 | d41 | d61 | | on data lines begins |
| 73–127 | ... | ... | ... | ... | ... | VPI[7:0] VCI[15:0] PTI[2:0], CLP are transferred on header lines during these cycles |
| 128 | d029 | d229 | d429 | d629 | F | GMUX to EPIF on |
| 129 | d129 | d329 | d529 | d729 | | data lines, |
| 130 | d030 | d230 | d430 | d630 | VPI[11] | EPIF to GMUX on header lines |

In Table 3-2 below, the term "dij" (i =0, ... 7; j=0 ... 31) denotes the jth 12-bit data word of a cell payload transferred on port 134A of channel 134.i. Thus, d10 is the first 12 bits of a payload transferred on port 134A of channel 134.1; d131 is the last 12 bits of a payload transferred on port 134A of channel 134.1.

TABLE 3-2

Data and Header Transfer on Ports 118.x Between Block 150 and Switch 144 (Data, i.e. Payloads, are Transferred to/from MBUF; Headers are Transferred to/from Switch Controller)

TABLE 3-2

Data and Header Transfer on Ports 118.x between Block 150 and Switch 144 (data, i.e. payloads, are transferred to/from MBUF; headers are transferred to/from switch controller)

| FCLK No. | Port 0/1 Data | Port 2/3 data | Port 4/5 Data | Port 6/7 Data | Headers | Comments |
|---|---|---|---|---|---|---|
| 131 | d130 | d330 | d530 | d730 | PTI[0] | MBUF to GMUX |
| 132 | d030 | d230 | d430 | d630 | CLP | transfer. |
| 133 | d131 | d331 | d531 | d731 | | Header transfers are at 25 MHz. Transfer of PTI[0] started in FCLK cycle 130. |
| 134 | d031 | d231 | d431 | d631 | F | MBUF to GMUX on data lines, GMUX to MBUF on header lines |
| 135 | d00 | d20 | d40 | d60 | | Starting cycle |
| 0 | d10 | d30 | d50 | d70 | VPI[11] | 135, the transfer |
| 1 | d01 | d21 | d41 | d61 | | is GMUX to MBUF |
| 2 | d11 | d31 | d51 | d71 | VPI[10] | on both data and |
| 3 | d02 | d22 | d42 | d62 | | header lines |
| 4–61 | ... | ... | ... | ... | ... | VPI[9:0] VCI[15:0] PTI[2:0] are transferred on header lines during these cycles |
| 62 | d131 | d331 | d531 | d731 | CLP | |

TABLE 3-2-continued

Data and Header Transfer on Ports 118.x between Block 150 and Switch 144 (data, i.e. payloads, are transferred to/from MBUF; headers are transferred to/from switch controller)

| FCLK No. | Port 0/1 Data | Port 2/3 data | Port 4/5 Data | Port 6/7 Data | Headers | Comments |
|---|---|---|---|---|---|---|
| 63 | P0 | P2 | P4 | P6 | | |
| 64 | P1 | P3 | P5 | P7 | V | |
| 65–67 | | | | | I | No data transfer between GMUX and MBUF. On header lines, the V and I bits are transferred in cycles 64–67 directly from EPIF to MBUF. These bits are not stored in data buffer 420 |
| 68 | none | none | none | none | V | On header lines, MBUF to GMUX transfer begins in cycle 68 |
| 69 | P1 | P3 | P5 | P7 | | On data lines, GMUX to MBUF transfer of parity occurs for data transferred in the previous switch cycle MBUF to GMUX transfer begins on data lines |
| 70 | P0 | P2 | P4 | P6 | VPI[11] | |
| 71 | d10 | d30 | d50 | d70 | | |
| 72 | d00 | d20 | d40 | d60 | VPI[10] | |
| 73 | d11 | d31 | d51 | d71 | | |
| 74–130 | ... | ... | ... | ... | ... | VPI[9:0] VCI[15:0] PTI[2:1] are transferred on header lines during these cycles, and transfer of PTI[0] is started |

TABLE 3-3

Data Buffer 420 Access Timing for Data Transfers Between Block 150 and Processor 130

| FCLK No. | Read/Write (R/W), and port no. | Comments |
|---|---|---|
| Transfer between MBUF and Buffer 420 | | |
| 131 | R2 | Each of R2–R7 reads (1) the second quarter (bits 96–191) of the cell payload for transfer to the MBUF on the respective port 2–7 (i.e. 118.2–118.7); and (2) the second 12 bits of the respective header for transfer to the switch controller. The cell will be transmitted to the MBUF starting the next FCLK cycle 71. Each of W1–W7 writes: (1) the second quarter of the cell payload received from the MBUF, from the respective port 1–7; and (2) the second 12 bits of the respective header. The cell was received from the MBUF starting the immediately preceding FCLK cycle 68 (the payload was received starting the FCLK cycle 71) |
| 132 | W1 | |
| 133 | R3 | |
| 134 | W2 | |
| 135 | R4 | |
| 0 | W3 | |
| 1 | R5 | |
| 2 | W4 | |
| 3 | R6 | |
| 4 | W5 | |
| 5 | R7 | |
| 6 | PF0 | Prefetch the first 108 bits of the cell to be transmitted to the MBUF on port 0 in the next switch cycle |
| 7 | R0 | Starting cycle 7, each of R0–R7 reads the third quarter of the cell to be transmitted to the MBUF on the respective port 0–7 in the current switch cycle. The third quarter includes 96 bits of payload and 12 bits of the header Starting cycle 12, each of W0–W7 writes the third quarter of the cell (payload and header) received from the MBUF. |
| 8 | W6 | |
| 9 | R1 | |
| 10 | W7 | |
| 11 | R2 | |
| 12 | W0 | |
| 13 | R3 | |
| 14 | W1 | |
| 15 | R4 | |
| 16 | W2 | |
| 17 | R5 | |
| 18 | W3 | |
| 19 | R6 | |
| 20 | W4 | |
| 21 | R7 | |
| 22 | PF1 | Prefetch the first 108 bits of the cell to be transmitted to the MBUF on port 1 in the next switch cycle |
| 23 | R0 | Starting cycle 23, each of R0–R7 reads the fourth quarter of the cell to be transmitted to the MBUF on the respective port 0–7 in the current switch cycle. The fourth quarter includes 96 bits of payload and the 12 bit parity |
| 24 | W5 | |
| 25 | R1 | |
| 26 | W6 | |
| 27 | R2 | |
| 28 | W7 | |
| 29 | R3 | |
| 30 | W0 | Starting cycle 30, each of W0–W7 writes to data buffer: (1) the first quarter (96 bits) of the cell payload received from EPIF on respective port 0–7 (i.e., port 134A of respective channel 134.0–134.7) in the same switch cycle (FCLK cycles 0–31), plus (2) bits 0–12 of the header received from EPIF on the respective port starting in FCLK cycle 128 of the previous switch cycle |
| 31 | R4 | |
| 32 | W1 | |
| 33 | R5 | |
| 34 | W2 | |
| 35 | R6 | |
| 36 | W3 | |
| 37 | R7 | |
| 38 | W4 | |
| 39 | PF2 | Prefetch the first 108 bits of the cell to be transmitted to the MBUF on port 2 in the next switch cycle |
| 40 | W5 | |
| 41 | R0 | Starting cycle 41, each of R0–R7 reads the first quarter of the cell payload and the first 12 bits of the header to be transmitted to EPIF on the respective port 0–7 (i.e. port 134A of channel 134.0–134.7). The headers will be transmitted to EPIF starting in FCLK cycle 65, the payloads starting in cycle 70. Starting cycle 46, each of W0–W7 writes the second quarter of the respective cell payload received from EPIF on respective port 0–7, and the second 12 bits of the respective header |
| 42 | W6 | |
| 43 | R1 | |
| 44 | W7 | |
| 45 | R2 | |
| 46 | W0 | |
| 47 | R3 | |
| 48 | W1 | |
| 49 | R4 | |
| 50 | W2 | |
| 51 | R5 | |
| 52 | W3 | |
| 53 | R6 | |
| 54 | W4 | |
| 55 | R7 | |
| 56 | W5 | |
| 57 | PF3 | Prefetch the first 108 bits of the cell to be transmitted to the MBUF on port 3 in the next switch cycle |
| 58 | W6 | |
| 59 | R0 | Starting cycle 59, each of R0–R7 reads the second quarter of the respective cell payload to be transmitted to EPIF on the respective port 0–7, and the second 12 bits of the respective header |
| 60 | W7 | |
| 61 | R1 | |

TABLE 3-3-continued

Data Buffer 420 Access Timing for Data Transfers Between Block 150 and Processor 130

| FCLK No. | Read/ Write (R/W), and port no. | Comments |
|---|---|---|
| 62 | W0 | Starting cycle 62, each of W0–W7 writes the |
| 63 | R2 | third quarter of the respective cell payload |
| 64 | W1 | received from EPIF on respective port 0–7, and |
| 65 | R3 | the third 12 bits of the respective header |
| 66 | W2 | |
| 67 | R4 | |
| 68 | W3 | |
| 69 | R5 | |
| 70 | W4 | |
| 71 | R6 | |
| 72 | W5 | |
| 73 | R7 | |
| 74 | W6 | |
| 75 | PF4 | Prefetch the first 108 bits of the cell to be transmitted to the MBUF on port 4 in the next switch cycle |
| 76 | W7 | |
| 77 | R0 | Starting cycle 77, each of R0–R7 reads the third |
| 78 | W0 | quarter of the respective cell payload to be |
| 79 | R1 | transmitted to EPIF on the respective port 0–7 |
| 80 | W1 | and the third 12 bits of the respective header, |
| 81 | R2 | and each of W0–W7 writes the fourth quarter of |
| 82 | W2 | the respective cell payload received from EPIF |
| 83 | R3 | on respective port 0–7 and the |
| 84 | W3 | cell's 12 bit parity |
| 85 | R4 | |
| 86 | W4 | |
| 87 | R5 | |
| 88 | W5 | |
| 89 | R6 | |
| 90 | W6 | |
| 91 | R7 | |
| 92 | W7 | |
| 93 | R0 | Starting cycle 93, each of R0–R7 reads the fourth quarter of the respective cell payload and the cell's 12 bit parity |
| 94 | PF5 | Prefetch the first 108 bits of the cell to be transmitted to the MBUF on port 5 in the next switch cycle |
| 95 | R1 | |
| 96 | W0 | Starting cycle 96, each of W0–W7 writes the |
| 97 | R2 | fourth quarter of the cell payload received |
| 98 | W1 | from the MBUF for the respective port 0–7, and |
| 99 | R3 | also writes the cell's parity. The cell was |
| 100 | W2 | received from the MBUF starting the immediately |
| 101 | R4 | preceding FCLK cycle 68 (the payload was |
| 102 | W3 | received starting the FCLK cycle 71) |
| 103 | R5 | |
| 104 | W4 | |
| 105 | R6 | |
| 106 | W5 | |
| 107 | R7 | |
| 108 | W6 | |
| 109 | PF6 | Prefetch the first 108 bits of the cell to be transmitted to the MBUF on port 6 in the next switch cycle |
| 110 | W7 | |
| 111 | R0 | Starting cycle 111, each of R0–R7 reads (1) the |
| 112 | W0 | first quarter of the cell (payload and header) |
| 113 | R1 | for transfer to the switch on the respective |
| 114 | W1 | port 0–7 (the payload is transferred to the |
| 115 | R2 | MBUF, the header to the switch controller). The |
| 116 | W2 | cell will be transmitted to the switch starting |
| 117 | R3 | the next FCLK cycle 71. Each of W0–W7 writes |
| 118 | W3 | (1) the first quarter of the cell payload |
| 119 | R4 | received from the MBUF for the respective port |
| 120 | W4 | 0–7; and (2) the second 12 bits of the |
| 121 | R5 | respective header |
| 122 | W5 | |
| 123 | R6 | |
| 124 | PF7 | Prefetch the first 108 bits of the cell to be transmitted to the MBUF on port 7 in the next switch cycle |
| 125 | R7 | |
| 126 | W6 | |
| 127 | R0 | Starting cycle 127, each of R0, R1 reads (1) the second quarter of the cell payload for transfer to the MBUF on the respective port 0–1; and (2) the second 12 bits of the |
| 128 | W7 | respective header for transfer to the switch controller. The cell will be |
| 129 | R1 | transmitted to the MBUF starting the next FCLK cycle 71. |
| 130 | W0 | W0 writes: (1) the second quarter of the cell payload received from the MBUF for port 0; and (2) the second 12 bits of the respective header. The cell was received from the MBUF starting the immediately preceding FCLK cycle 68 (the payload was received starting the FCLK cycle 71) |

Addendum 4

Pseudocode for Data Receive in CtoE Block 150CE

I. Pseudocode for Determining the Data Buffer 420 Address to Which the Cells are to be Written.

Block 150CE uses the following registers for the data receive operation:

(1) WP is a write pointer for queue 240 (FIG. 2);

(2) WP_port[0], ... WP_port[7]-- are write pointers for respective ports 118E.0, ... 118 E.7. WP_port[x] points to the queue entry starting which the cell received on the port 118E.x will be written;

(3) sc_hdr_valid[0:7] are header valid bits for cells received on respective ports 118E.0–118E.7.

The pseudocode for determining the WP_port values (performed once for all the eight ports 118E.x in each switch cycle) follows. The pseudocode syntax is similar to that of the programming language C.

1. Wait for sc_hdr_valid[0:7] bits to arrive from ports 118E.x 2. for (i=0; i<8; i++) {
   if (sc_hdr_valid[i]) {
     WP_port[i]=WP;
     WP++; // WP is incremented to
            // the next cell location
   }
   else {// invalid cell
     WP_port[i]=WP+8; # WP+8 points to a
                      # scratch location for the current
                      # switch cycle since at most 8
                      # cells will be written to the
                      # queue in the current
                      # cycle. The invalid cell
                      # will be written to this scratch
                      # location.

II. Pseudocode for Frame Link FIFO Update

The following registers are used:
(1) CFSA (Current Frame Start Address) points to the start of the current frame being written to queue 240;
(2) CFSA_valid stores the valid flag for CFSA;
(3) tx_flink_main is the main 32-entry frame link FIFO for general traffic (similar to FLINK in FIG. 7);
(4) tx_flink_specific[0:7] are eight separate frame link FIFOs, one per channel 160E.x (FIG. 2). Each such FIFO has two to four entries. Each FIFO tx_flink_specific[x] stores addresses of frames whose destination is the respective processing channel 134.x of processor 130; ordering FIFO 220E will not have entries for these frames.

Each frame link FIFO tx_flink_main, tx_flink_specific[x] stores frame addresses in the order in which the frames arrive at port 118.

The frame link FIFO update pseudocode follows:
```
for (i=0; i<8; i++) {
  if (sc_hdr_valid[i]){
    if (~CFSA_valid) {
      CFSA <-WP_port[i];
      CFSA_valid <-1;
    }
  if (sc_hdr_pti[2,0]==2'b01) {
    # End of frame. Indicated by
    # PTI bits 2 and 0 being 0 and
    # 1 respectfully.
    if (vpi[7]=='1') {#channel
      # specific frame
      push(tx_flink_specific
          (vpi[2:0], CFSA)
        # VPI[2:0] is the channel
        # number (0 through 7) of
        # channel 134.x to which
        # the frame received on
        # port 118E.i is to be
        # dispatched.
        # The CFSA value is
        # pushed into the
        respective channel-
        # specific frame link
        # FIFO.
    }
    else {# non-channel specific
      # frame
      push(tx_flink_main, CFSA)
      # push the CFSA value
      # into the
      # main frame link FIFO.
```

Addendum 5

GtoE to EtoC Serial Message Format (line MSGI of FIG. 4)

The following information is transmitted each switch cycle:
(1) Data Count from RxSOF messages (data[16:0]), i.e. the count of frames dropped by the GMAC.
(2) GtoE drop count due to errors as seen in RxEOF control words (Addendum 2).
(3) Parity error in data received from GMAC
(4) Part number (16 bits).

Addendum 6

Memory

In some embodiments the ordering FIFOs 220I, 220E are implemented by a dual FIFO circuit IDT722V241 available from Integrated Device Technology, Inc. (IDT) of Santa Clara, Calif.

Data buffers 410 and 420 are implemented by ZBT (zero bus turn-around) synchronous RAMs (SRAMs) available from IDT.

Data Buffer 410

The read and write accesses to this data buffer alternate as shown in the following tables 6–1 below. These tables use the following notation:

wG is a write access by block 154GE (writing Ethernet data from the GMAC);

r0–7 are reads by block 154GE for respective ingress channels 160I. 0–160I.7;

w0–7 are writes by block 154EG for respective egress channels 160E. 0–160E.7;

rG is a read by block 154EG for data to be transmitted to the GMAC.

TABLES 6-1

| 62.5 MHz Clock Cycle: | 0 | 1 | 2 | 3 | 4 | 5 | 6 | 7 |
|---|---|---|---|---|---|---|---|---|
| Access | wG | r0 | w0 | rG | wG | r1 | w1 | rG |
| 62.5 MHz Clock Cycle: | 8 | 9 | 10 | 11 | 12 | 13 | 14 | 15 |
| Access | wG | r2 | w2 | rG | wG | r3 | w3 | rG |
| 62.5 MHz Clock Cycle: | 16 | 17 | 18 | 19 | 20 | 21 | 22 | 23 |
| Access | wG | r4 | w4 | rG | wG | r5 | w5 | rG |
| 62.5 MHz Clock Cycle: | 24 | 25 | 26 | 27 | 28 | 29 | 30 | 31 |
| Access | wG | r6 | w6 | rG | wG | r7 | w7 | rG |

Figure 20:
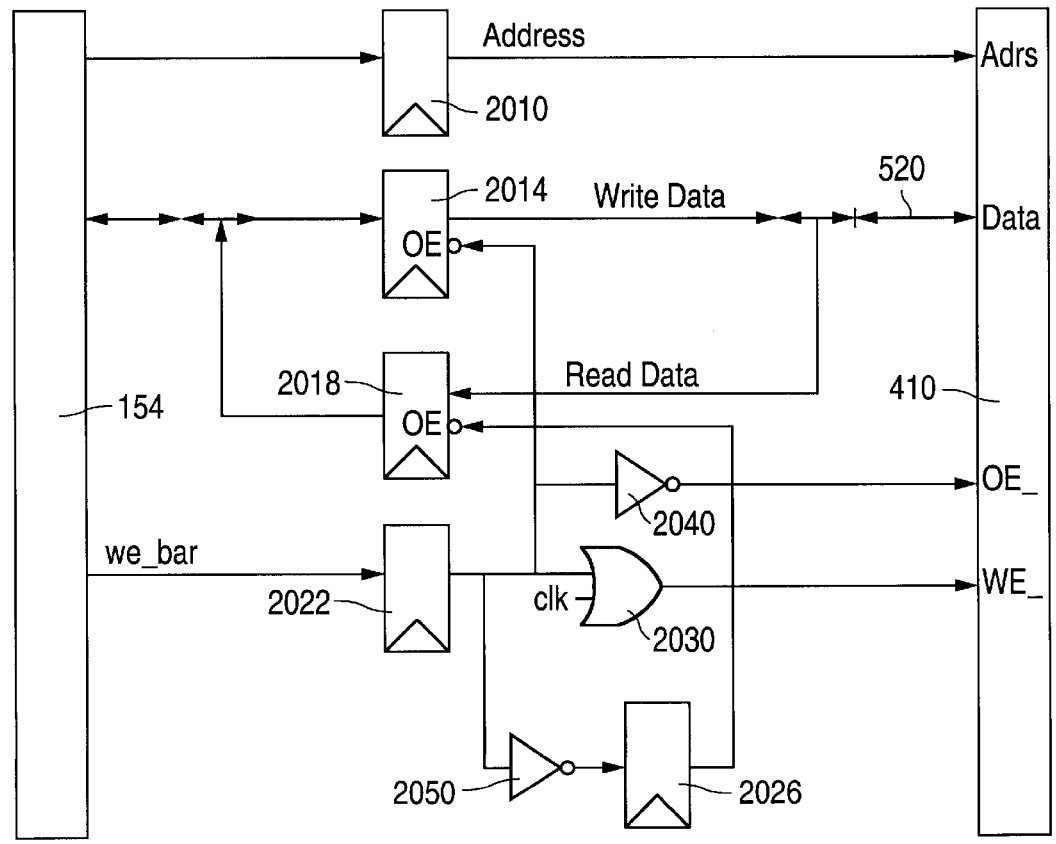
FIGS. 20 and 21 are block diagrams that illustrate memory interface circuitry in some embodiments of the system of FIG. 4.

In some embodiments, asynchronous RAMs are used to implement data buffer 410, using glue logic illustrated in FIG. 20. The logic includes address latch 2010, write data latch 2014, read data latch 2018, write enable latch 2022, latch 2026, OR gate 2030 having an input receiving a 62.5 MHz clock signal CLK, and inverters 2040, 2050. The glue logic works properly because there is no problem with read-after-write data hazards for consecutive write-read cycles. This is because no piece of data is ever read immediately (in the next cycle) after being written to the data buffer.

Data Buffer 420

In this buffer, the read and write cycles do not always alternate in the embodiment of Addendum 3 because a prefetch read PFi may occur immediately before or after another read (prefetches are described above connection with FIG. 18). However, at least one cycle occurs between consecutive writes.

Figure 21:
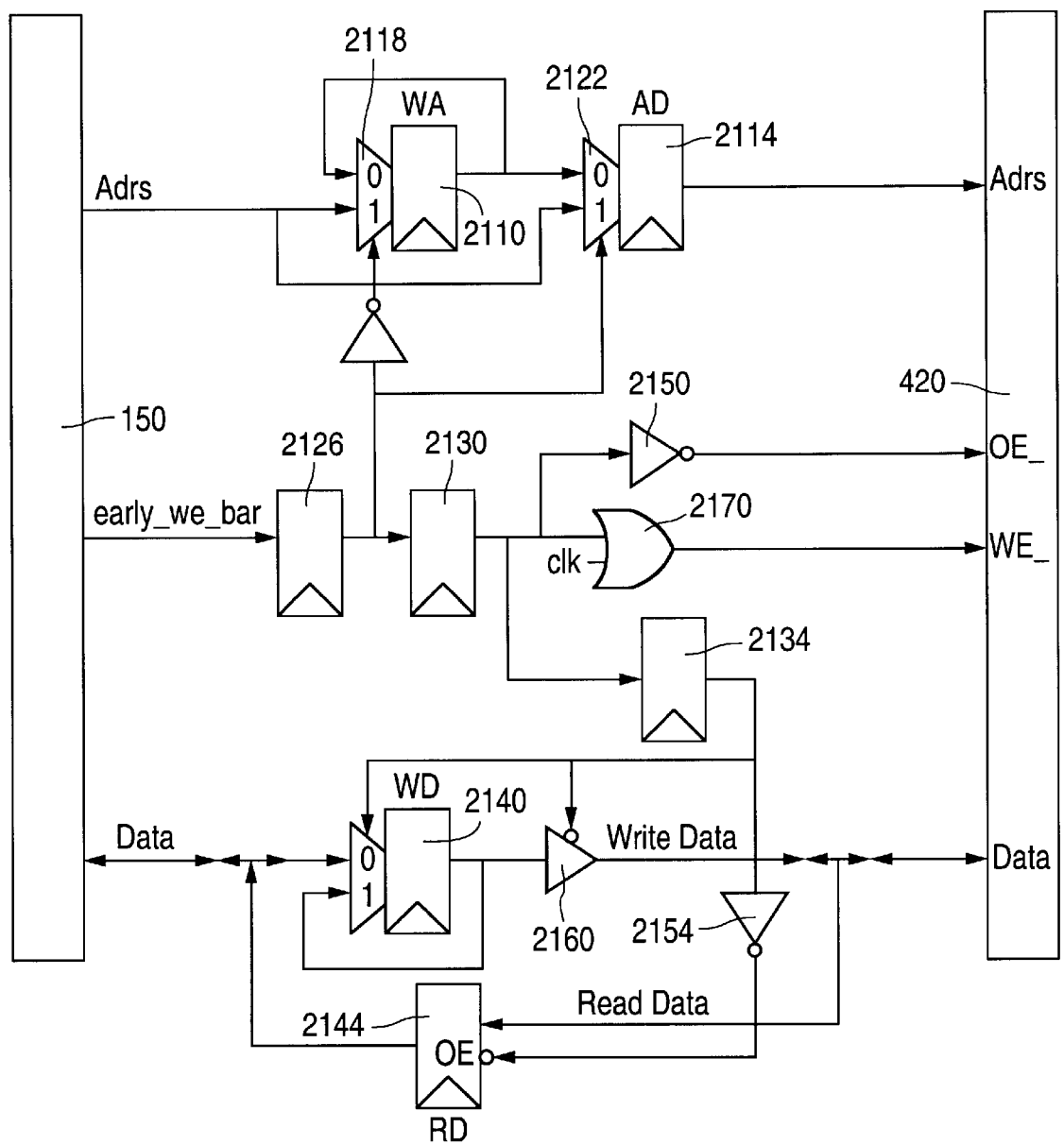

In some embodiments, data buffer 420 is implemented by an asynchronous memory using glue logic illustrated in FIG. 21. The glue logic includes write address latch 2110, address latch 2114, multiplexers 2118, 2122, latches 2126, 2130, 2134, write data latch 2140, latch 2144, inverters 2150, 2154, 2160, and OR gate 2170 having an input receiving the 50 Mhz clock. The logic works because read-after-write data hazards are not a danger. An exemplary timing diagram is shown in Tables 6–2 below. In these tables, "AD" stands for address, "WA" for write address, "WD" for write data, and "RD" for read data.

TABLES 6-2

| 50 MHz clock cycle: | 0 | 1 | 2 | 3 | 4 | 5 | 6 | 7 |
|---|---|---|---|---|---|---|---|---|
| GMUX I/O | | | | | | | | |
| Adrs | x | W1 | R2 | W3 | R4 | W5 | R6 | W7 |
| Data | x | x | x | D1 | D2 | D3 | D4 | D5 |
| early_we_ | 0 | 1 | 0 | 1 | 0 | 1 | 0 | 1 |
| Registers | | | | | | | | |
| AD | x | | | R2 | W1 | R4 | W3 | R6 |
| WA | | | W1 | W1 | W3 | W3 | W5 | W5 |
| WD | | | | | D1 | — | D3 | — |
| RD | | | | | D2 | x | D4 | x |
| RAM op | | | | R2 | W1 | R4 | W3 | R6 |

| 50 MHz clock cycle: | 8 | 9 | 10 | 11 | 12 | 13 | 14 |
|---|---|---|---|---|---|---|---|
| GMUX I/O | | | | | | | |
| Adrs | R8 | R9 | R10 | W11 | R12 | | |
| Data | D6 | D7 | D8 | D9 | D10 | D11 | D12 |
| early_we_ | 1 | 1 | 0 | 1 | | | |
| Registers | | | | | | | |
| AD | W5 | R8 | R9 | R10 | W7 | R12 | |
| WA | W7 | W7 | W7 | W7 | W11 | | |
| WD | D5 | — | D7 | D7 | D7 | — | D11 |
| RD | D6 | x | D8 | D9 | D10 | x | D12 |
| RAM op | W5 | R8 | R9 | R10 | W7 | R12 | |

What is claimed is:

1. A method for transferring data between one or more first network ports receiving one or more first data flows and one or more second network ports transmitting one or more second data flows, the method comprising:
   dispatching data from the one or more first data flows to multiple processing channels;
   processing data in parallel by two or more of the processing channels; and
   receiving data processed by the processing channels and dispatching the processed data into the one or more second flows on the one or more second ports,
   wherein, in at least one flow of the first and second flows, data are transferred in frames, and each frame of said one flow is processed by a single one of the processing channels but at least two of the frames of said one flow are processed by two different processing channels.

2. The method of claim 1 wherein one or more first flows have a greater throughput provided by each said processing for processing data dispatched to the channel from the one or more first flows.

3. The method of claim 1 wherein data received in at least one first data flow are transmitted in at least one second data flow in the same order in which the data were received in said at least one first data flow.

4. The method of claim 1 further comprising:
   for each frame received from at least one first flow, when the frame is dispatched to a processing channel, providing to a circuitry receiving the data from the processing channels a channel identification (ID) of the processing channel to which the frame is dispatched, such that said circuitry receives the channel IDs in the same order in which the respective frames arrived in said at least one first flow, wherein when the circuitry receives a channel ID the circuitry dispatches a corresponding frame processed by the corresponding processing channel into a second flow, such that frames are dispatched into at least one second flow from the processing channels in the order of the channel IDs.

5. A method for transferring data between one or more first network ports receiving one or more first data flows and one or more second network ports transmitting one or more second data flows, the method comprising:
   dispatching data from the one or more first data flows to multiple processing channels;
   processing data in parallel by two or more of the processing channels, wherein, in at least one of the first and second flows, data are transferred in frames, and each frame is processed by a single one of the processing channels but at least two of the frames are processed by two different processing channels;
   receiving data processed by the processing channels and dispatching the processed data into the one or more second flows on the one or more second ports;
   for each frame received from at least one first flow, when the frame is dispatched to a processing channel, providing to a circuitry receiving the data from the processing channels a channel identification (ID) of the processing channel to which the frame is dispatched, such that said circuitry receives the channel IDs in the same order in which the respective frames arrived in said at least one first flow, wherein when the circuitry receives a channel ID the circuitry dispatches a corresponding frame processed by the corresponding processing channel into a second flow, such that frames are dispatched into at least one second flow from the processing channels in the order of the channel IDs; and
   dispatching a marker frame to a processing channel PC1 which is one of the processing channels, and also providing to the circuitry a channel ID identifying the channel PC1 and indicating that a corresponding frame is a marker frame, the circuitry processing marker frames to correct a frame ordering violation if such a violation is present.

6. The method of claim 5 wherein when the circuitry receives the channel ID identifying the channel PC1 and indicating a marker frame, if the circuitry discovers that a corresponding frame from the channel PC1 is not a marker frame, the circuitry does not dispatch said corresponding frame from the channel PC1 at least until receipt of another channel ID identifying the channel PC1.

7. The method of claim 5 wherein when the circuitry receives a channel ID indicating a non-marker frame but the corresponding frame from the processing channel identified by the ID is a marker frame, the circuitry does not dispatch any frame following the marker frame from said processing channel at least until the circuitry receives an ID identifying said processing channel and indicating a marker frame.

8. The method of claim 5 further comprising repeatedly dispatching marker frames to all the processing channels.

9. The method of claim 5 wherein when the circuitry has processed a marker frame received from a processing channel, the circuitry signals that another marker frame can be dispatched to the same processing channel, and another marker frame is not dispatched until the circuitry has signaled that the other frame can be dispatched.

10. The method of claim 5 wherein if the circuitry has discovered a frame ordering violation in connection with frames on the channel PC1, the circuitry requests a marker frame to be dispatched to the channel PC1.

11. The method of claim 1 wherein there is only one first flow and only one second flow.

12. The method of claim 1 wherein in at least one of the first and second flows data are transferred in frames of a variable size.

13. The method of claim 12 wherein in at least one of the first and second flows data are transferred in cells of a fixed size, and the processing channels transform data between a fixed-size format and a variable-size format.

14. A circuit for transferring data between one or more first network ports receiving one or more first data flows and one or more second network ports transmitting one or more second data flows, the system comprising:
- a first circuit for dispatching data from the one or more first data flows to multiple processing channels; and
- a second circuit for receiving data processed by the processing channels and for dispatching the processed data into the one or more second flows on the one or more seconds ports,
- wherein, in at least one flow of the first and second flows, data are transferred in frames, and the first circuit is to dispatch each frame of said one flow to a single one of the processing channels but to dispatch at least two of the frames of said one flow to two different processing channels.

15. The system of claim 14 wherein at least one of the first and second flows has a greater throughput than at least one of the processing channels.

16. The system of claim 14 in combination with the processing channels.

17. The system of claim 14 wherein the second circuit is to transmit data in at least one second data flow in the same order in which the data were received in at least one first data flow.

18. The system of claim 14 further comprising an ordering circuit for providing to the second circuit a channel identification (ID) of the processing channel to which a frame is dispatched by the first circuit, such that the second circuit is to receive the channel IDs from said ordering circuit in the same order in which the respective frames arrived in at least one first flow, wherein when the second circuit receives a channel ID the second circuit dispatches a frame from the corresponding processing channel into a second flow, such that frames are dispatched into at least one second flow from the processing channels in the order of the channel IDs.

19. A circuit for transferring data between one or more first network ports receiving one or more first data flows and one or more second network ports transmitting one or more second data flows, the system comprising:
- a first circuit for dispatching data from the one or more first data flows to multiple processing channels, wherein in at least one of the first and second flows data are transferred in frames, and the first circuit is to dispatch each frame to a single one of the processing channels but to dispatch at least two of the frames to two different processing channels;
- a second circuit for receiving data processed by the processing channels and for dispatching the processed data into the one or more second flows on the one or more seconds ports;
- an ordering circuit for providing to the second circuit a channel identification (ID) of the processing channel to which a frame is dispatched by the first circuit, such that the second circuit is to receive the channel IDs from said ordering circuit in the same order in which the respective frames arrived in at least one first flow, wherein when the second circuit receives a channel ID the second circuit dispatches a frame from the corresponding processing channel into a second flow, such that frames are dispatched into at least one second flow from the processing channels in the order of the channel IDs; and
- the first circuit comprises a marker circuit for dispatching a marker frame to a processing channel PC1 which is one of the processing channels, and also for providing to the second circuit a channel ID identifying the channel PC1 and indicating that the corresponding frame is a marker frame, wherein the second circuit is to process marker frames to correct a frame ordering violation if such a violation is present.

20. The system of claim 19 wherein when the second circuit receives the channel ID identifying the channel PC1 and indicating a marker frame, if the second circuit discovers that the corresponding frame from the channel PC1 is not a marker frame, the second circuit does not dispatch said corresponding frame from the channel PC1 into a second flow at least until receipt of another channel ID identifying the channel PC1.

21. The system of claim 19 wherein when the second circuit receives a channel ID indicating a non-marker frame but the corresponding frame from the processing channel identified by the ID is a marker frame, the second circuit does not dispatch any frame following the marker frame from said processing channel at least until the second circuit receives an ID identifying said processing channel and indicating a marker frame.

22. The system of claim 19 wherein the first circuit comprises a circuit for repeatedly dispatching marker frames to all the processing channels.

23. The system of claim 19 wherein the second circuit comprises a signaling circuit such that when the second circuit has processed a marker frame received from a processing channel, the signaling circuit signals to the first circuit that another marker frame can be dispatched to the same processing channel, and the first circuit is not to dispatch another marker frame to the processing channel until receiving a signal from the signaling circuit.

24. The system of claim 19 wherein the second circuit comprises a send-marker request circuit such that when the second circuit has discovered a frame ordering violation in connection with frames on the channel PC1 the send-marker request circuit requests a marker frame to be dispatched to the channel PC1.

25. The system of claim 14 wherein the system comprises only one first port for receiving only one first flow and only one second port for receiving only one second flow.

26. The system of claim 14 wherein in at least one of the first and second flows data are to be transferred in frames of a variable size.

27. The system of claim 26 wherein in at least one of the first and second flows data are to be transferred in cells of a fixed size, and the processing channels are to transform data between a fixed-size format and a variable-size format.

28. The method of claim 5 wherein said at least two frames processed by two different processing channels are in a single flow referred to as "at least one of the first and second flows."

29. The system of claim 19 wherein said at least two frames processed by two different processing channels are in a single flow referred to as "at least one of the first and second flows."

30. The method of claim 1 wherein the processing of data in parallel is performed in hardware in the same clock cycle by two or more of the processing channels.

31. The system of claim 14 wherein the processing of data in parallel is performed in hardware in the same clock cycle by two or more of the processing channels.

32. The method of claim 1 further comprising:
for each frame received from at least one first flow, when the frame is dispatched to a processing channel, storing in a first-in-first-out (FIFO) memory a channel identification (ID) of the processing channel to which the frame is dispatched;

a circuitry in receipt of the data from the processing channels, retrieving from the FIFO memory the channel IDs in the same order in which the respective frames arrived in said at least one first flow; and said circuitry dispatching a corresponding frame processed by the corresponding processing channel into a second flow, such that frames are dispatched into at least one second flow from the processing channels in the order of the channel IDs in the FIFO memory.

33. The system of claim 14 further comprising:

a first-in-first-out (FIFO) memory holding a plurality of channel identifications (IDs) of a corresponding plurality of processing channels, in an order in which the respective frames arrived in said at least one first flow;

wherein the FIFO memory is coupled to receive the plurality of channel IDs from the first circuit and is coupled to provide the plurality of channel IDs to the second circuit.

34. A method for processing data by a circuit operable to process a plurality of data flows associated with said circuit, the method comprising:

receiving data units on a first data flow;

dispatching data units received on the first flow to different data flows associated with said circuit, wherein each data unit is dispatched to one of the associated data flows, and at least two different data units are dispatched to respective different ones of the associated flows;

for each dispatched data unit, providing an identification of the associated flow to which the data unit was dispatched, wherein the identifications are provided in the order in which the data units were received on the first flow and dispatched to said associated flows;

said circuit processing said data units and providing processed data units on said associated flows; and ordering the processed data units and dispatching them to a second data flow, wherein the ordering and dispatching operation comprises:

receiving the identifications of the associated flows to which the data units from the first flow were dispatched; and when an identification is received, inserting into the second flow a data unit provided by the associated flow identified by said identification.

35. The method of claim 34 further comprising:

dispatching a marker frame to an associated data flow AD1 which is one of the associated data flows;

providing an identification of associated data flow AD1 and indicating that a corresponding frame is a marker frame; and said inserting into the second data flow is suspended when processing of marker frames indicates a frame ordering violation if such a violation is present.

36. A data processing system comprising:

a plural flow circuit operable to process a plurality of data flows associated with the plural flow circuit;

a first circuit for receiving data units on a first data flow and dispatching the data units to the plural flow circuit, wherein each data unit is to be dispatched to one of the data flows associated with said plural flow circuit, and different data units are operable to be dispatched to respective different data flows associated with the plural flow circuit; and a second circuit for receiving data units processed by the plural flow circuit and dispatching the processed data units to a second flow;

wherein the first circuit comprises circuitry to provide, for each dispatched data unit, an identification of the flow associated with the plural data circuit to which flow the data unit was dispatched, wherein the identifications are provided in the order in which the data units were received on the first flow and dispatched to the plural flow circuit;

wherein the second circuit is to dispatch the processed data units to the second flow in the order of said identifications, the identifications being used to specify the data flows associated from the plural data circuit from which flows the processed data units are dispatched to the second flow.

37. The data processing system of claim 36 wherein:

the first circuit comprises a marker circuit for dispatching a marker frame to a data flow DF associated with the plural flow circuit, and also for providing to the second circuit an identifier identifying the data flow DF and indicating that the corresponding frame is a marker frame, wherein the second circuit is to process marker frames to correct a frame ordering violation if such a violation is present.

* * * * *